United States Patent [19]

Morinaga et al.

[11] 4,367,530
[45] Jan. 4, 1983

[54] CONTROL APPARATUS FOR AN INTERNAL COMBUSTION ENGINE

[75] Inventors: Shigeki Morinaga; Sanshiro Obara, both of Hitachi; Hiroastu Tokuda, Katsuta; Hideo Nakamura, Tokyo, all of Japan

[73] Assignee: Hitachi, Ltd., Tokyo, Japan

[21] Appl. No.: 226,042

[22] Filed: Jan. 19, 1981

Related U.S. Application Data

[63] Continuation of Ser. No. 951,509, Oct. 16, 1978, abandoned.

[30] Foreign Application Priority Data

Oct. 19, 1977 [JP] Japan .................................. 52-125986

[51] Int. Cl.³ ............................ F02D 5/00; F02P 5/04; G05B 15/02
[52] U.S. Cl. ............................... 364/431.06; 123/417; 123/487; 364/431.12
[58] Field of Search ................ 123/416, 417, 425, 486, 123/487, 488; 364/431.04, 431.05, 431.06, 300, 442

[56] References Cited

U.S. PATENT DOCUMENTS

| | | | |
|---|---|---|---|
| 3,821,715 | 6/1974 | Hoff, Jr. et al. | 364/200 |
| 3,906,207 | 9/1975 | Rivere et al. | 364/425 |
| 3,969,614 | 7/1976 | Moyer et al. | 364/431.06 |
| 4,099,495 | 7/1978 | Kiencke et al. | 364/442 |
| 4,176,629 | 12/1979 | Kawai et al. | 123/186 X |
| 4,212,066 | 7/1980 | Carp et al. | 364/431.05 |
| 4,255,789 | 3/1981 | Hartford et al. | 364/431.06 |

OTHER PUBLICATIONS

Robbi et al.: Microprocessor Ignition Advance System, New Electronics Apr. 19, 1977, vol. 10, No. 8, pp. 75, 76, 78.
RCA Microprocessor Products CDP 1801, CDP 1801 C. printed 9-1975.
Binder et al.: Car Control by a Central Electronic System SAE paper #770001(1977).

*Primary Examiner*—Felix D. Gruber
*Attorney, Agent, or Firm*—Antonelli, Terry & Wands

[57] ABSTRACT

A control apparatus for an internal combustion engine includes a plurality of sensors for producing signals indicative of operating conditions of the engine, an input/output unit adapted to receive sensed signals and to deliver control signals to actuators which control an energy conversion function of the engine and a central-processor unit coupled with the input/output unit and adapted to execute an arithmetic operation for producing data to be sent to the input/output unit. The input-/output unit includes a first register file having a plurality of registers for storing constants and data produced by the central processor unit and a second register file having a plurality of registers for storing signals indicative of conditions of the engine as of a selected instant in time during which the engine is operative. A comparator is provided to compare the contents of the selected one of registers of the first register file with the content of the selected one of registers of the second register file, and the resultant output is applied to the actuators. The first register file further includes a register storing a prescribed constant with which selected ones of the registers of the second register file are compared by the comparator in response to the contents of prescribed ones of the second register file causing the comparator to produce an output.

72 Claims, 26 Drawing Figures

| STAGE PULSE | STAGE COUNTER | | | | | | | | | |
|---|---|---|---|---|---|---|---|---|---|---|
| | $C_9$ | $C_8$ | $C_7$ | $C_6$ | $C_5$ | $C_4$ | $C_3$ | $C_2$ | $C_1$ | $C_0$ |
| INTL-P | X | X | X | X | X | X | X | 0 | 0 | 1 |
| CYL-P | X | X | X | X | X | X | X | 0 | 1 | 0 |
| ADV-P | X | X | X | X | X | X | X | 0 | 1 | 1 |
| DWL-P | X | X | X | X | X | X | X | 1 | 0 | 0 |
| RPM-P | X | X | X | X | X | X | X | 1 | 0 | 1 |
| VSP-P | X | X | X | X | X | X | X | 1 | 1 | 0 |
| RPMW-P | X | X | X | 0 | 0 | 1 | 0 | 0 | 0 | 0 |
| EGRP-P | X | X | 0 | 0 | 1 | 1 | 0 | 0 | 0 | 0 |
| EGRD-P | X | X | 1 | 0 | 1 | 1 | 0 | 0 | 0 | 0 |
| NIDLP-P | X | X | 0 | 1 | 0 | 1 | 0 | 0 | 0 | 0 |
| NIDLD-P | X | X | 1 | 1 | 0 | 1 | 0 | 0 | 0 | 0 |
| ENST-P | 0 | 1 | 0 | 0 | 0 | 0 | 0 | 0 | 0 | 0 |
| VSPW-P | 1 | 0 | 0 | 0 | 0 | 0 | 0 | 0 | 0 | 0 |
| INTV-P | 1 | 1 | 0 | 0 | 0 | 0 | 0 | 0 | 0 | 0 |
| INTVR-P | 0 | 0 | 0 | 0 | 0 | 0 | 0 | 0 | 0 | 0 |
| INJ-P (IF TREG = 000) | X | X | X | X | X | X | X | 1 | 1 | 1 |
| INJ-P (IF TREG = 001) | X | X | X | X | X | X | 0 | 1 | 1 | 1 |
| INJ-P (IF TREG = 010) | X | X | X | X | X | 0 | 0 | 1 | 1 | 1 |
| INJ-P (IF TREG = 011) | X | X | X | X | 0 | 0 | 0 | 1 | 1 | 1 |
| INJ-P (IF TREG = 100) | X | X | X | 0 | 0 | 0 | 0 | 1 | 1 | 1 |
| INJ-P (IF TREG = 101) | X | X | 0 | 0 | 0 | 0 | 0 | 1 | 1 | 1 |
| STAGE0-P | X | X | X | X | X | X | X | 0 | 0 | 0 |
| STAGE 7-P | X | X | X | X | X | X | X | 1 | 1 | 1 |

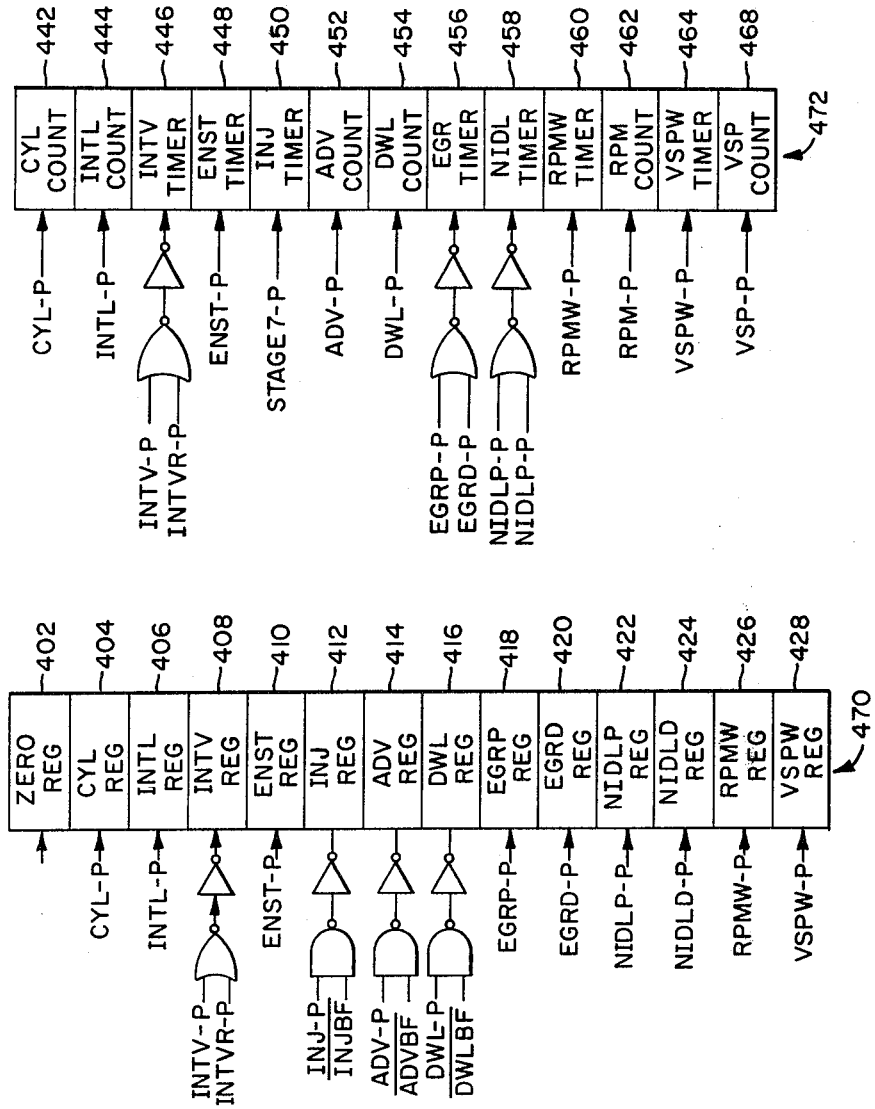
FIG. 10.
FIG. 8B.
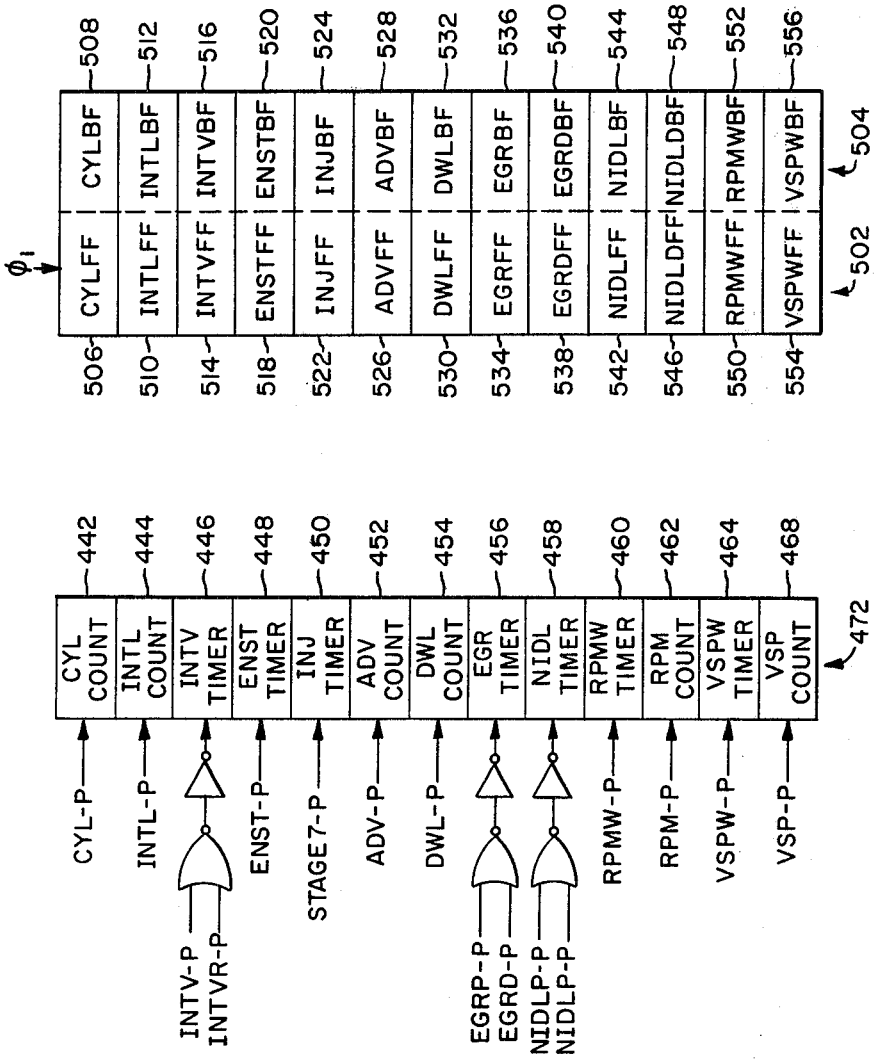
FIG. 8A.

CONTROL APPARATUS FOR AN INTERNAL COMBUSTION ENGINE

This is a continuation of application Ser. No. 951,509, filed Oct. 16, 1978 and now abandoned.

CROSS REFERENCE TO RELATED APPLICATIONS

The present application relates to subject matter disclosed in the following applications:

| Ser. No. | Filing Date | Inventor(s) | Pat. No. | Issue Date |
|---|---|---|---|---|
| 943,930 | Sept. 20, 1978 | Tokuda et. al. | 4,276,601 | June 30, 1981 |
| 952,275 | Oct. 18, 1978 | Takato et. al. | 4,280,189 | July 21, 1981 |
| 952,276 | Oct. 18, 1978 | Tokuda et. al. | 4,277,829 | July 7, 1981 |
| 952,279 | Oct. 18, 1978 | Tokuda et. al. | 4,309,759 | Jan. 5, 1982 |
| 952,326 | Oct. 18, 1978 | Imai et. al. | 4,310,889 | Jan. 12, 1982 |
| 952,531 | Oct. 18, 1978 | Imai et. al. | 4,312,038 | Jan. 19, 1982 |
| 952,532 | Oct. 18, 1978 | Tokuda et. al. | 4,274,141 | June 16, 1981 |
| 952,533 | Oct. 18, 1978 | Imai et. al. | 4,282,573 | Aug. 4, 1981 |
| 011,845 | Feb. 13, 1979 | Furuhashi et. al. | 4,310,888 | Jan. 12, 1982 |
| 059,029 | July 19, 1979 | Obara et. al. | 4,276,602 | July 30, 1981 |
| 060,751 | July 26, 1979 | Furuhashi et. al. | 4,296,722 | Oct. 27, 1981 |
| 064,431 | Aug. 7, 1979 | Furuhashi | 4,274,142 | June 16, 1981 |
| 073,085 | Sept. 6, 1979 | Imai et. al. | | |

FIELD OF THE INVENTION

This invention relates to an apparatus for the control of an internal combustion engine and more particularly to an apparatus for controlling the engine, using an electronic processing unit.

Although the general principles of the present invention are applicable to all combustion engines, for the purpose of better understanding of the present invention, the description is hereinafter made in detail in connection with its application to a reciprocating, fuel injected, internal combustion engine.

DESCRIPTION OF THE PRIOR ART

The development of the auto industry has introduced into everyday life a convenient means of transportation while, at the same time, causing social problems, One of the social problems is air pollution created by automobile exhaust gases; another is the immense consumption of energy by the automobile.

In recent years, much effort has been made for decreasing the emission of pollutants. Unfortunately, countermeasures against the emission of exhaust gases have, in many cases, resulted in lowering the conversion efficiency of heat energy, released by the combustion of fuel, into mechanical energy, so that larger amounts of fuel have become necessary for automobile operation.

In order to attain a high conversion efficiency from heat energy to mechanical energy and the low emission of pollutants at the same time, electronic controls have been developed using a digital processing unit.

For example, in SAE paper 770001 (1977), automobile control by a central electronic system is described. The system includes transducers to measure the vehicle conditions and sense the driver's intention, an electronic control unit for information processing, and power amplifiers to drive AC actuators and a display. This control system is designed to effect ignition control, fuel injection control, automatic transmission control, etc. It is noted that in order for each of the abovenamed controls, this system comprises many subsystems including an ignition control unit, an injection control unit, and a gear control unit, each of which receives various sensed conditions necessary for its own control.

In general, it is desirable to effect total control using one control unit rather than using separate control units which operate independently of each other, in order to decrease exhaust gas emission and to provide a high conversion efficiency. This is mainly caused by the various controls for the internal combustion engine, such as the ignition control and the injection control mutually dependent upon each other, so that the total control system may provide more effective and accurate control for the engine than the individual control subsystems. Furthermore, the use of several subsystems complicates and increases the cost of the control circuit as a whole.

SUMMARY OF THE INVENTION

An object of the present invention is the provision of a control apparatus for an internal combustion engine which is adapted for the total control of fuel injection, exhaust gas recirculation (hereinafter referred to as EGR), ignition timing, etc.

Another object of the present invention resides in providing an engine control apparatus comprising engine condition sensors, a central processing unit, and an input/output control unit, wherein the input/output control unit has a relatively simple circuit configuration.

A further object of the present invention resides in providing an apparatus for controlling the engine with a high conversion efficiency and with a reduced emission of exhaust gases.

According to the present invention, gas injection control, the ignition control, EGR control, idle rotational speed control of the engine, and detection of the engine turn-off (hereinafter referred to as elementary operations) can be performed by a control apparatus including a CPU (central processing unit), a ROM (read only memory), and an I/O (Input/Output) control unit.

The I/O control unit comprises a first register file including a plurality of registers, a second register file including a plurality of counters and timers, an incrementer for incrementing the value set in the counter or timer in response to engine operating conditions as of a selected instant in time, a comparator for comparing the set value of a register selected from the first register file with the value of a counter or timer selected from the second register file, and an output logic circuit connected with the comparator for producing output signals required for the elementary operations of the automotive vehicle.

Some of the registers of the first register file store data produced by arithmetic operations in the CPU on the basis of sensed signals indicative of engine operating conditions and the other registers store constants which are determined by, for example, the number of cylinders used.

The counters or timers of the second register file count pulses indicative of engine operating conditions, for example, pulses produced in synchronism with the rotation of the engine. The timings of the start and termination for the counting operation of the counters are controlled by the incrementer.

The comparator compares in a time sharing manner, the values stored in the registers of the first register file with the counted values of the counters and timers of the second register file. The use of a single comparator for comparing the values of a plurality of registers with those of a plurality of counters advantageously simplifies the circuit configuration of the comparator unit. This advantage is especially effective when the I/O controller is formed or fabricated in a semi-conductor chip by employing SLI (large scale integration) technology.

According to the present invention, the I/O controller further comprises a stage counter which produces stage pulses for the control of the elementary operations. In synchronism with the stage pulses, the selection of a register and a counter from the first and second register files and processing of output signals of the comparator are sequentially performed in a predetermined order. Even when the sensed pulses occur irregularly in time, these pulses are synchronized with the stage pulses before they are utilized for the elementary operation, so that the sensors can be of a simple configuration.

The other objects, features, and advantages of the present invention will become more apparent from a detailed description of embodiments of the invention when taken in conjunction with the accompanying drawings.

BRIEF DESCRIPTION OF THE DRAWINGS

FIGS. 8A and 8B are schematic diagrams showing first and second register files of the input/output units;

FIG. 10 shows a schematic diagram of an output register group of the input/output unit;

DETAILED DESCRIPTION OF THE PREFERRED EMBODIMENTS

Figure 1:
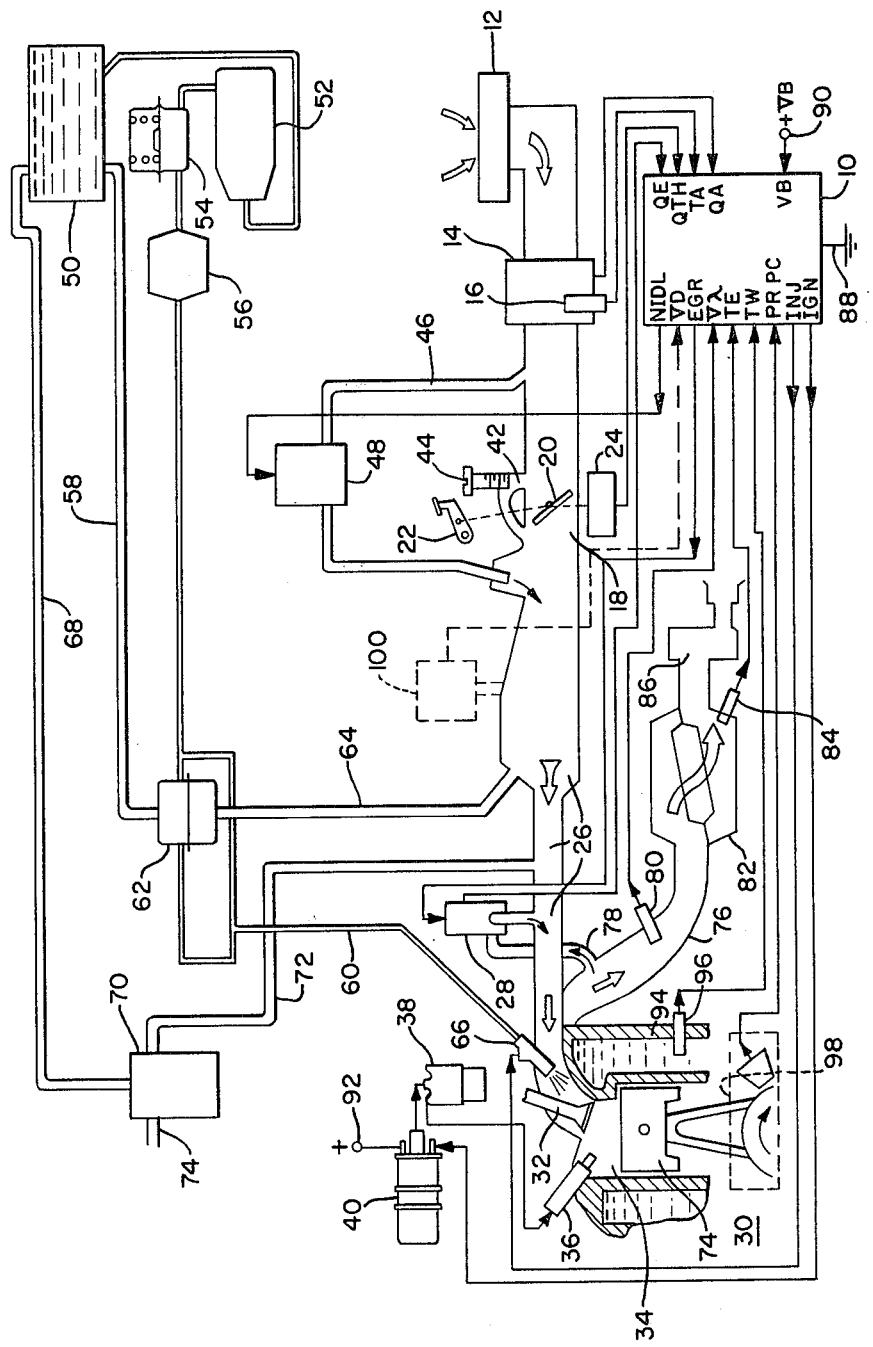
FIG. 1 is a diagram showing an engine control system for a fuel-injected, internal combuation engine.

An embodiment of this invention will now be described with reference to FIG. 1 showing a system diagram of an electronic engine control apparatus. Air taken in through an air cleaner 12 has its flow rate measured by an air flow meter 14, from which an output signal QA representative of the quantity of flow of the air is supplied to a control circuit 10. The air flow meter 14 is provided with a temperature sensor 16 for detecting the temperature of the suction air, and an output signal TA representative of the temperature of the suction air is also supplied into the control circuit 10.

The air having passed through the air flow meter 14 passes through a throttle chamber 18, and is sucked from an intake manifold 26 through a suction valve 32 into a combustion chamber 34 of an engine 30. The quantity of air to be sucked into the combustion chamber 34 is controlled by varying the degree of opening of a throttle valve 20 disposed within a throttle chamber in mechanical connection with an accelerator pedal 22. The angular position of the throttle valve 20 is detected by a throttle position detector 24. A signal QTH representative of the position of the throttle valve 20 is supplied the throttle position detector 24 to the control circuit 10.

The throttle chamber 18 is provided with a bypass passage 42 for idling and an idle adjust screw 44 for adjusting the quantity of air to pass through the bypass passage 42. Where the engine is operating in the idling state, the throttle vale 20 is fully closed. The suction air from the air flow meter 14 flows through the bypass passage 42, and is sucked into the combustion chamber 34. Accordingly, the quantity of suction air in the idling operation state is varied by the adjustment of the idle adjustment screw 44. Since energy to be generated in combustion chamber 34 is substantially determined by the quantity of air from the bypass passage 42, the engine revolution velocity in the idling state can be adjusted to an appropriate value by adjusting the idle adjustment screw 44, thus varying the quantity of suction air into the engine.

The throttle chamber 18 is further provided with another bypass passage 46 and an air regulator 48. The air regulator 48 controls the quantity of air to pass through the passage 46 in response to an output signal NIDL from control circuit 10, to control the engine revolution velocity during engine warm-up and the supply of appropriate quantity of air to the engine for a sudden change of the throttle valve 20. If necessary, the flow rate of air during the idling operation can also be varied.

Now, the fuel feed system will be described. Fuel stored in a fuel tank 50 is drawn into a fuel pump 52, and is fed under pressure to a fuel damper 54. The fuel damper 54 absorbs the pressure pulsation of the fuel from the fuel pump 52 so as to feed fuel of a predetermined pressure to a fuel pressure regulator 62 through a fuel filter 56. The fuel from the fuel pressure regulator 62 is fed under pressure to a fuel injector 66 through a fuel pipe 60. In response to an output signal INJ from the control circuit 10, the fuel injector 66 is opened to inject the fuel into the engine.

The quantity of fuel injected from the fuel injector 66 is determined by the valve opening time of the injector 66 and the difference between the pressure of the fuel fed under pressure to the injector 66 and the pressure of the intake manifold 26 into which the fuel in injected. It is desirable, however, that the quantity of fuel injection from the fuel injector 66 depend only on the valve opening time which is determined by the signal from the control circuit 10. Therefore, the pressure of the fuel feed to the fuel injector 66 is controlled by the fuel pressure regulator 62 so that the difference between the fuel pressure to the fuel injector 66 and the manifold pressure of the intake manifold 26 may be constant at all times. The intake manifold pressure is coupled to the fuel pressure regulator 62 through a pressure conduit 64. When the fuel pressure in the fuel pipe 60 becomes a certain value higher than this intake manifold pressure, the fuel pipe 60 and a fuel return pipe 58 communicate with each other, and fuel corresponding to the excess pressure is returned to the fuel tank 50 through the fuel return pipe 58. In this way, the difference between the fuel pressure in the fuel pipe 60 and the manifold pressure in the intake manifold 26 is always held constant.

The fuel tank 50 is further provided with a pipe 68 and a canister 70 for absorbing gases with the vaporized fuel. During the operation of the engine, air is drawn in from an atmospheric air port 74, and the absorbed fuel gas is fed to the intake manifold 26 by a pipe 72 and then to the engine 30.

As explained above, fuel is injected from the fuel injector, and the suction valve 32 is opened in synchronism with the motion of a piston 74, so that a mixture consisting of the air and the fuel is led to the combustion chamber 34. The mixture is compressed and is ignited by spark energy from an ignition plug 36, whereby the combustion energy of the mixture is converted into kinetic energy for moving the piston.

The burnt mixture is emitted from an exhaust value (not shown) through an exhaust pipe 76, a catalytic converter 82, and a muffler 86 to the atmosphere as exhaust gas. The exhaust pipe 76 is provided with an exhaust gas recirculation pipe 78 (hereinbelow abbreviated to EGR pipe), through which part of the exhaust gas is led to the intake manifold 26. That is, part of the exhaust gas is returned to the suction side of the engine. The quantity of recirculated gas is determined by the valve opening degree of an exhaust gas recirculator 28. The valve opening degree is controlled by an output signal EGR of the control circuit 10. Further, the valve position of the exhaust gas recirculator 28 is converted into an electric signal and is supplied to the control circuit 10 as a signal QE.

In the exhaust pipe 76, there is provided a so-called λ sensor 80, which detects the mixing ratio of the mixture sucked in the combustion chamber 34. As the λ sensor, an O₂ sensor (oxygen sensor) is ordinarily used, and it detects an oxygen concentration in the exhaust gas and generates a voltage Vλ responsive to the oxygen concentration. The output Vλ of the λ sensor 80 is supplied to the control circuit 10. The catalytic converter 82 is provided with an exhaust gas temperature sensor 84, the output signal TE of which corresponding to the exhaust gas temperature is supplied to the control circuit 10.

The control circuit 10 is coupled via a negative terminal 88 and a positive terminal 90 to a power source. Further, a signal IGN for controlling the sparking of the foregoing ignition plug 36 is applied to the primary coil of an ignition coil 40 from the control circuit 10, and a high voltage generated in the secondary coil thereof is applied to the ignition plug 36 through a distributor 38, so that sparks for combustion are generated within the combustion chamber 34. More concretely, the ignition coil 40 is coupled via a positive terminal 92 to the power source and the control circuit 10 is provided with a power transistor for controlling the primary coil current of the ignition coil 40. A series circuit consisting of the primary coil of the ignition coil 40 and the power transistor is formed between the positive power source terminal 92 of the ignition coil 40 and the negative power source terminal 88 of the control circuit 10. By rendering the power transistor conductive, electromagnetic energy is stored in the ignition coil 40, and by rendering the power transistor nonconductive, the electromagnetic energy is applied to the ignition plug 36 as energy having a high voltage.

The engine 30 is provided with a water temperature sensor 96, which detects the temperature of engine coolant 94 and a signal TW thus detected is applied to the control circuit 10. Further, the engine 30 is provided with an angle sensor 98 for detecting the rotational position of the engine. By means of the sensor 98, a reference signal PR is generated every 120°, for example, in synchronism with the rotation of the engine, and an angle signal PC is generated each time the engine is rotated by a predetermined angle (e.g. 0.5°). These signals PR and PC are supplied to the control circuit 10.

In the system of FIG. 1, a negative pressure sensor may be used instead of the air flow meter 14. A component 100 indicated by dotted lines in the Figure is the negative sensor, from which a voltage VD corresponding to the negative pressure of the intake manifold 26 is produced and supplied to the control circuit 10.

As the negative pressure sensor, a semiconductor negative pressure sensor 10 may be used in which the boost pressure of the intake manifold is caused to act on one side of a silicon chip, while the atmospheric pressure or a fixed pressure is caused to act on the other side. A vacuum may be used in some cases. With such a structure, the voltage VD corresponding to the manifold pressure is generated by the action of the piezoresistive effect or the like and is applied to the control circuit 10.

Figure 2:
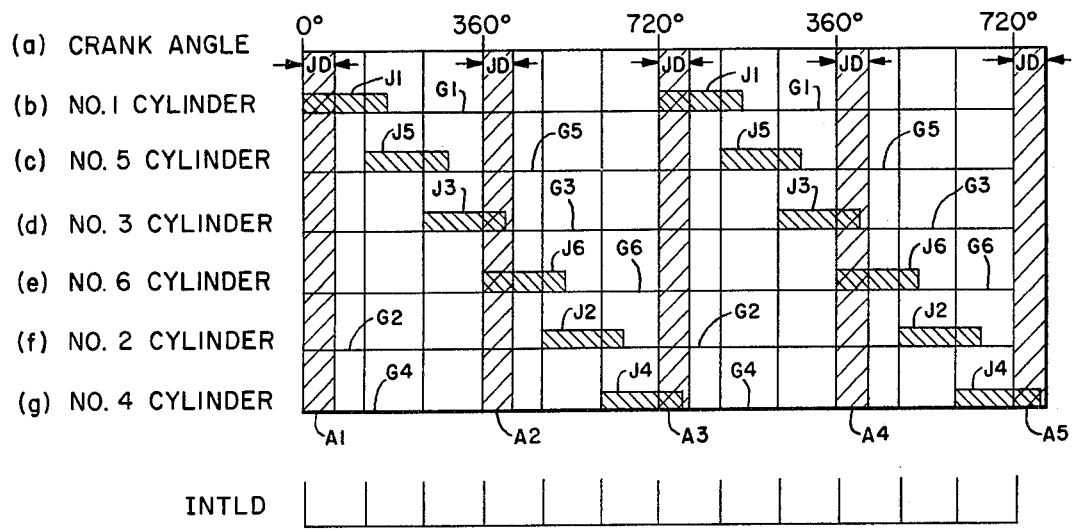
FIG. 2 shows timings of fule injection and ignition with respect to crank angle.

FIG. 2 is an operational diagram for explaining the ignition timing and the fuel injection timing of a six-cylinder engine plotted in accordance with the crank angle. In the Figure, (a) represents the crank angle. A rotation sensor output signal PR is provided from the angle sensor 98 every 120° of the crank angle. From this sensor signal PR, there is produced an interval reference signal INTLD, as will be discussed below, every 0°, 120°, 240°, 360°, 480°, 600°, or 720° of the crank angle as shown in the lower portion of FIG. 2.

In FIG. 2, (b), (c), (d), (e), (f), and (g) illustrate the operations of the first cylinder, the fifth cylinder, the third cylinder, the sixth cylinder, the second cylinder, and the fourth cylinder, respectively. J1 through J6 represent the valve opening positions of the suction valves of the respective cylinders. As shown in FIG. 2, the valve opening positions of the respective cylinders are shifted by 120° in terms of the crank angle. Although the valve opening positions and the valve opening widths differ to some extent in dependence on each engine structure, they are substantially as indicated in the Figure.

Reference symbols A1 through A5 in the Figure indicate the valve opening timings or fuel injection timings of the fuel injector 66. The time width JD of each of the injection timings A1 through A5 represents the valve opening time of the fuel injector 66. The time width JD can be considered as representing the quantity of fuel injected from the fuel injector 66. The fuel injectors 66 are disposed in correspondence with the respective cylinders, and they are connected in parallel with a driver circuit within the control circuit 10. Accordingly, the fuel injectors corresponding to the respective cylinders open the valves and inject fuel at each occurrence of the signal INJ from the control circuit 10. Operation will be explained with reference to the first cylinder illustrated in FIG. 2. In synchronism with the reference signal INTLD generated at 360° of the crank angle, (the relationship in timing between PR and INTLD will be explained later) output signal INJ is applied from the control circuit 10 to the fuel injectors 66 which are disposed at the manifolds or suction ports of the respective cylinders. Thus, fuel is injected as shown at A2 for the period of time JD calculated by the control circuit 10. Since, however, the first cylinder has its suction valve closed, the injected fuel is held near the suction port of the first cylinder and is not sucked into the cylinder. In response to the reference signal INTLD arising at the point 720° of the crank angle, the signal is sent from the control circuit to the fuel injectors 66 again, and the fuel injection shown at A3 is carried out. At substantially the same time as the injection, the suction valve of the first cylinder is opened. Upon this valve opening, both the fuel injected at A2 and the fuel injected at A3 are sucked into the combustion chamber. The same applies to the other cylinders. That is, in the fifth cylinder illustrated in (c), fuel quantities injected at A2 and A3 are sucked in at the valve opening position J5 of the suction valve. In the third cylinder illustrated in (d), part of the fuel injected at A2, the fuel injected at A3 and part of the injected fuel at A4 are sucked in at the valve opening position J3 of the suction valve. When the part of the fuel injected at A2 and the part of the fuel injected at A4 are put together, they become the quantity of injection corresponding to one injecting operation. Also, in each suction stroke of the third cylinder, the quantity of injection corresponding to two injecting operations is sucked in. Likewise, in the sixth cylinder, second cylinder, or fourth cylinder illustrated a (e), (f), or (g), respectively, the quantity of injection corresponding to two injecting operations of the fuel injector is sucked in by one suction stroke. As understood from the above explanation, the quantity of fuel injection assigned by the fuel injection signal INJ from the control circuit 10 is half the necessary fuel amount to be sucked in, and the necessary fuel amount corresponding to the air sucked into the combustion chamber 34 is obtained by two injecting operations of the fuel injector 66.

In FIG. 2, reference symbols G1 through G6 indicate ignition timings corresponding to the first cylinder through the sixth cylinder respectively. By rendering the power transistor disposed within the control circuit 10 nonconductive, the primary coil current of the ignition coil 40 is cut-off to generate the high voltage in the secondary coil. The generation of the high voltage is effected at the ignition timings G1, G5, G6, G2, and G4, and power is distributed by the distributor 38 to the ignition plugs disposed in the respective cylinders. Thus, the ignition plugs ignite in the order of the first cylinder, fifth cylinder, third cylinder, sixth cylinder, second cylinder, and fourth cylinder, and the mixture consisting of the fuel and the air burns.

Figure 3:
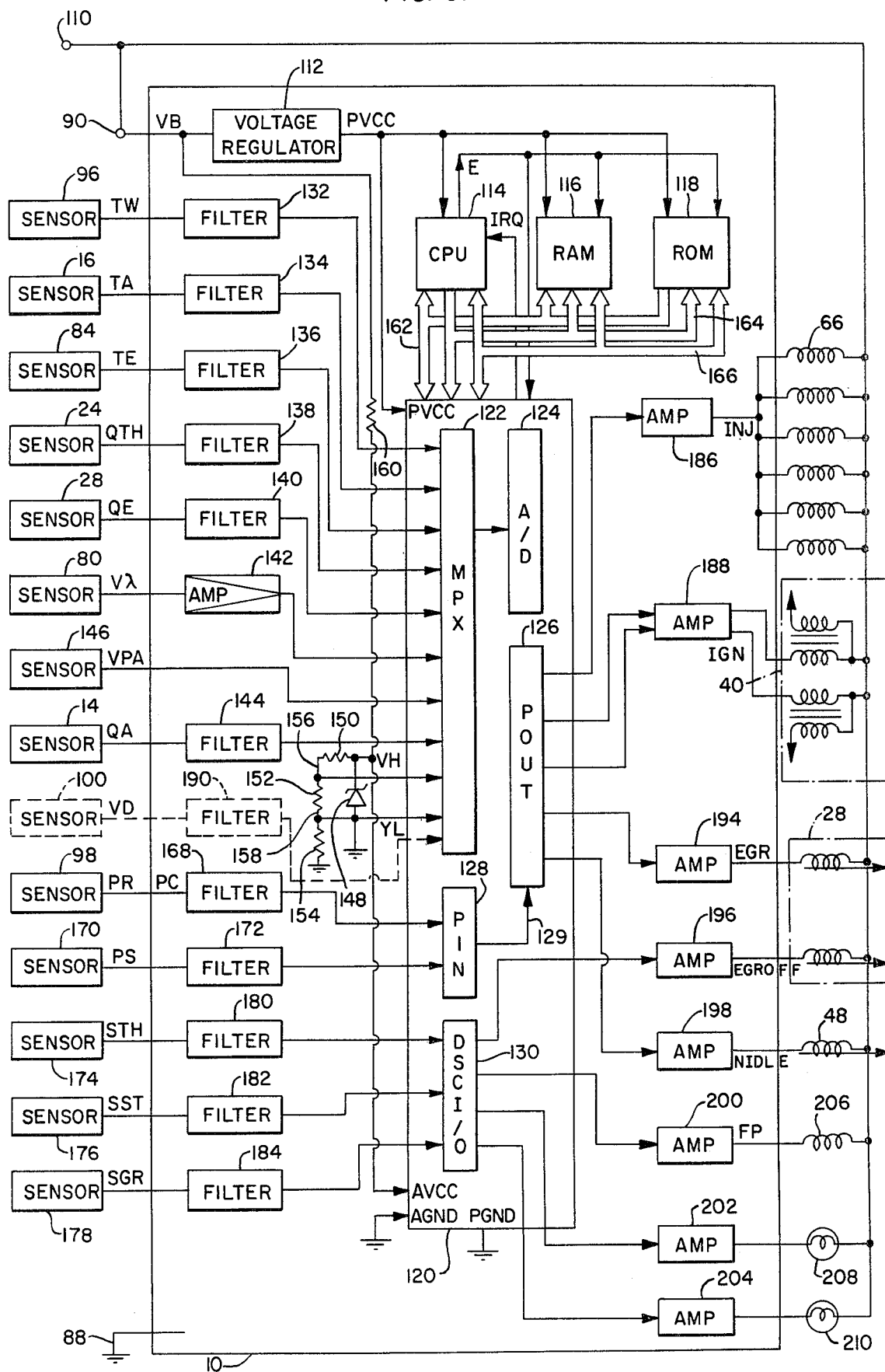
FIG. 3 is a block diagram showing a control unit of the engine control system shown in FIG. 1.

CONTROL UNIT (10):

A detailed circuit arrangement of the control circuit 10 in FIG. 1 is shown in FIG. 3. The positive power source terminal 90 of the control circuit 10 is connected to a plus terminal 110 of a battery and a voltage VB is supplied to the control circuit 10. The supply voltage VB is held constant at a fixed voltage PVCC, e.g. 5 V, by a voltage regulator circuit 112. The fixed voltage PVCC is supplied to a central processor 114 (hereinbelow abbreviated as CPU), a random access memory 116 (hereinbelow abbreviated as RAM), and a read only memory 118 (hereinbelow abbreviated as ROM). Further, the output PVCC of the voltage regulator circuit 112 is applied to an input/output circuit 120.

The input/output circuit 120 has a multiplexer 122, an analog/digital converter 124, a pulse output circuit 126, a pulse input circuit 128, and a discrete input/output circuit 130.

Analog signals are applied to the multiplexer 122 from the various sensors. One of the input signals is selected on the basis of a command from the CPU, and is coupled via multiplexer 122 to analog-to-digital converter 124. The analog input signals include the analog signal TW representative of the temperature of the cooling water of the engine, the analog signal TA representative of the suction temperature, the analog signal TE representative of the exhaust gas temperature, the analog signal QTH representative of the throttle opening, the analog signal QE representative of the valve opening state of the exhaust gas recirculator, the analog signal Vλ representative of the excess air ratio of the sucked mixture and the analog signal QA representative of the quantity of sucked air, the signals being derived from the sensors shown in FIG. 1, i.e. the water temperature sensor 96, the suction temperature sensor 16, the exhaust temperature sensor 84, the throttle position detector 24, the exhaust gas recirculator 28, the λ sensor 80 and the air-flow meter QA, through filters 132 through 144. Among them, the output Vλ of the λ sensor 80 is applied to the multiplexer through the amplifier 142 which includes a filter circuit.

In addition, an analog signal VPA representative of the atmospheric pressure is applied from an atmospheric pressure sensor 146 to the multiplexer 122. The voltage VB is supplied from the positive power source terminal 90 through a resistor 160 to a series circuit consisting of resistors 150, 152, and 154. Further, the terminal voltage of the series circuit composed of the resistors is kept constant by a zener diode 148. The values of voltages VH and VL at respective junctures 156 and 158 between the resistors 150 and 152 and the resistors 152 and 154 are applied to the multiplexer 122.

The CPU 114, RAM 116, ROM 118, and the input/output circuit 120 are respectively coupled to a data bus 162, an address bus 164, and a control bus 166. Further, an enabling signal E is applied from the CPU 114 to the RAM 116, the ROM 118, and the input/output circuit 120. In synchronism with the enabling signal E, the transmission of data through the data bus 162 is effected.

Signals representative of water temperature TW, suction air temperature TA, exhaust gas temperature TE, throttle opening QTH, quantity of exhaust gas recirculation QE, λ sensor output Vλ, atmospheric pressure VPA, quantity of suction air QA, reference voltage VH and VL, and negative pressure VD in place of the quantity of suction air QA are respectively supplied to multiplexer 122 of the input/output circuit 120.

On the basis of an instruction program stored in the ROM 118, the CPU 114 assigns the addresses of these inputs through the address bus, and the analog inputs of the assigned addresses are stored. The analog inputs are sent from the multiplexer 122 to the analog-to-digital converter 124. The digital values are stored in registers corresponding to the respective inputs, and they are loaded into the CPU 114 or RAM 116 on the basis of instructions from the CPU 114 fed through the control bus 166, as may be needed.

The reference pulses PR and the angle signal PC are applied to the pulse input circuit 128 through a filter 168 from the angle sensor 98 in the form of pulse trains. Further, from a vehicular velocity sensor 170, pulses PS at a frequency corresponding to a vehicular velocity are applied to the pulse input circuit 128 through a filter 172 in the form of a pulse train.

Signals processed by the CPU 114 are held in the pulse output circuit 126. An output from the pulse output circuit 126 is applied to a power amplifier circuit 186, and the fuel injectors are controlled on the basis of the signal.

Shown at 188, 194, and 198 are power amplifier circuits, which respectively control the primary coil current of the ignition coil 40, the degree of opening of the exhaust gas recirculator 28, and the degree of opening of the air regulator 48 in response to the output pulses from the pulse output circuit 126. The discrete input/output circuit 130 receives and holds signals from a switch 174 for detecting that the throttle valve 20 is in the fully closed state, a starter switch 176 and a gear switch 178 indicating that the transmission gear is a top gear, through filters 180, 182, and 184 respectively. Further, it stores the processed signals from the CPU 114. The signals with which the discrete input/output circuit 130 is concerned are signals each of which can have its content indicated by one bit. Subsequently, signals are sent from the discrete input/output circuit to power amplifier circuits 196, 200, 202, and 204 by the signals from the CPU 114. The amplified signals are used to close the exhaust gas recirculator 28 to stop the recirculation of the exhaust gas, control the fuel pump, indicate an abnormal temperature of the catalyst and indicate the overheat of the engine, respectively.

Figure 4:
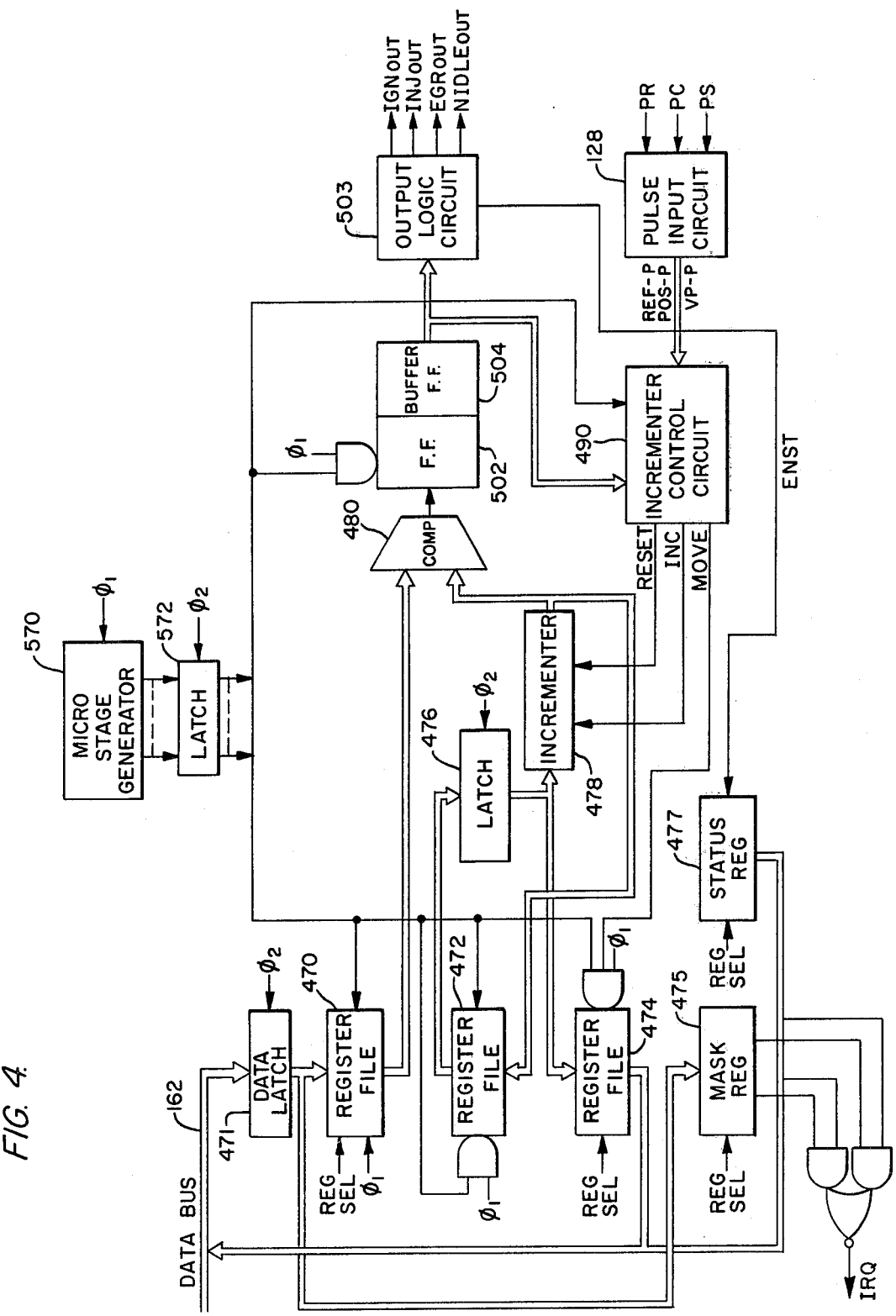
FIG. 4 is a block diagram showing a pulse output unit of the control unit shown in FIG. 3.

PULSE OUTPUT CIRCUIT (126):

FIG. 4 shows a concrete configuration of the pulse output circuit 126. A first register file 470 includes a group of reference registers which hold the data processed by the CPU 114 or hold data indicative of predetermined values. The data is transmitted through the data bus 162 from the CPU 114. The assignment of the registers to hold the data is effected through the address bus 164, and the data is applied to the assigned registers and held therein.

A second register file 472 includes a group of registers which hold the signals indicative of the engine condition at an instant in time. The second register file 472, a latch circuit 476, and an incrementer 478 effect a so-called counter function.

A third register file 474 includes, for example, a register for holding the rotational speed of the engine and a register for holding the vehicular speed. These values are obtained in such a way that when certain conditions are fulfilled, the values of the second register file are loaded. A relevant register is selected by a signal sent through the address bus from the CPU and the data held in the third register file 474 is sent to the CPU 114 through the data bus 162 from this register.

A comparator 480 receives reference data from a register selected from the first register file and instantaneous data from a register selected from the second register file and executes a comparative operation. The comparison result is delivered to and stored in a predetermined register selected from first register group 502 which function as comparison result holding circuits. Further, it is thereafter stored in a predetermined register selected from a second register group 504.

The read and write operations of the first, second, and third register files 470, 472, and 474 and the operations of the incrementer 478 and the comparator 480, and the operations of setting outputs into the first and second register group 502, 504 are conducted during prescribed periods of time. Various processes are carried out in a time division manner in conformity with the stage sequence of a stage counter 570. At each stage, predetermined registers among the first and second register files and the first and second register groups and, if necessary, a predetermined register among the third register file 474 are selected. The incrementer 478 and the comparator 480 are used in common.

Description will be hereinafter given of each of the units making up pulse output unit 126.

Figure 7:
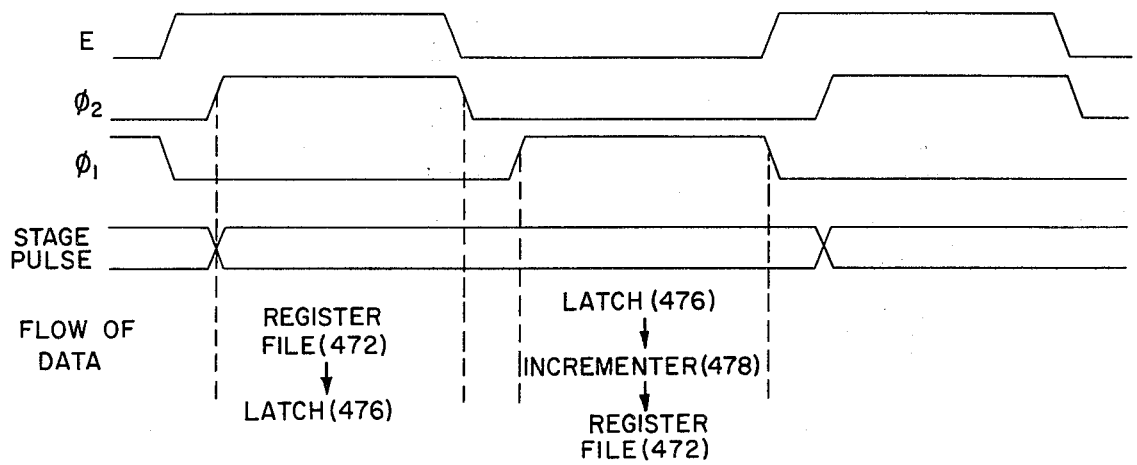
FIG. 7 shows waveforms of clock pulses and stage pulses.
Figure 9:
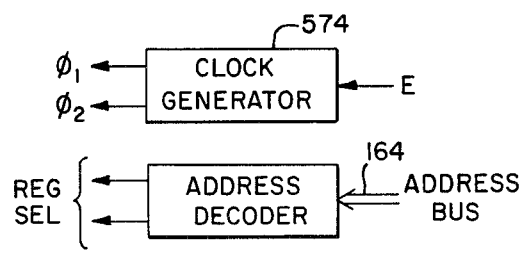
FIG. 9 is a block diagram showing a clock generator and an address decoder.
Figures 5, 6:
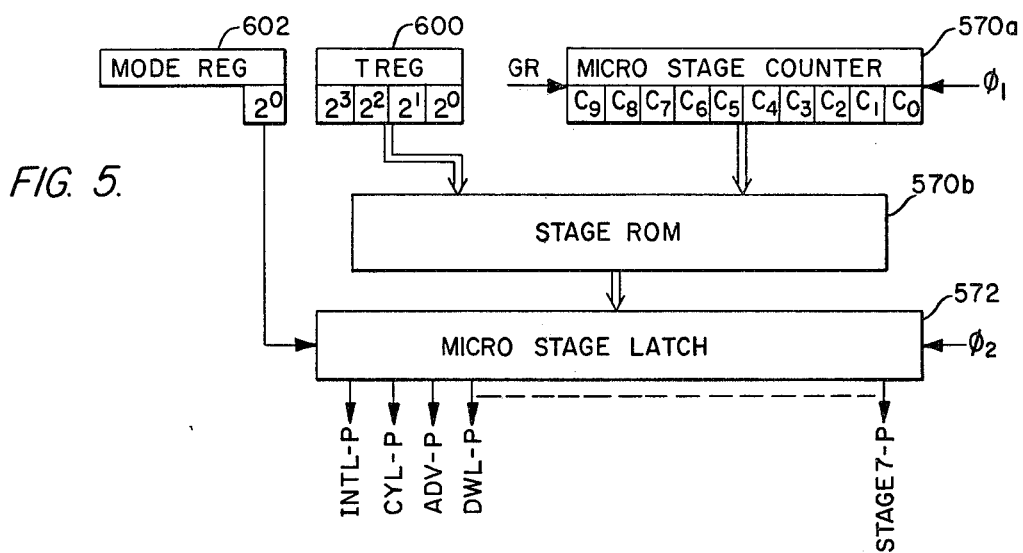
FIG. 5 shows schematic diagram of a microstage pulse generator of the input/output unit.
FIG. 6 is a table showing the relation between stage pulses and contents of a stage counter.

STAGE PULSE GENERATOR (570):

In FIG. 5, the stage pulse generator 570 includes a microstage counter 570a, a stage ROM (read only memory), and a microstage latch circuit 572. When an enabling signal E is applied to a clock generator 574 as shown in FIG. 9, clock generator 574 produces clock pulses $\phi_1$ and $\phi_2$ as shown in FIG. 7. The pulses $\phi_1$ and $\phi_2$ are different in phase and do not overlap. As can be seen in FIG. 5, the clock pulse $\phi_1$ is applied to the stage ROM 570b. The microstage counter 570a is a ten bit counter, for example, and operates to count the clock pulses $\phi_1$ applied thereto. The counted value of the microstage counter 570a is applied together with an output from a register 600 (hereinafter referred to as T register) to the stage ROM 570b. ROM 570b is designed to produce stage pulses INTL-P~STAGE 7-P in accordance with the contents of the microstage counter 570a and T register 600.

FIG. 6 shows the relationship between various kinds of stage pulses and the contents of the counter 570a and T register 600. In this table of FIG. 6, symbol X denotes that any one of "1" and "0" can be taken for the purpose of producing stage pulse as far as the bit X is concerned. By way of example, when the lowest three bits C2, C1, and C0 of the microstage counter 570a are "0", "0", and "1", respectively, a stage pulse INTL-P is delivered. The set value of the T register 600 functions to determine intervals between stage pulses INJ-P, as can be seen in the table. A thus produced stage pulse is shifted to the microstage latch circuit 572 in synchronism with the clock pulse $\phi_2$. The stage pulse is delivered from the latch circuit 572 when the lowest bit 2° of a mode register 602 is of the logical "1". The mode register 602 is set with the logical "1" when CPU 114 produces G0 signal and is set with the logical "0" when CPU 114 outputs Non-G0 signal. When the lowest bit 2° of the mode register 602 is of the logical "0", the stage latch circuit 572 delivers no stage pulse except for the predetermined stage pulses STAGE 0-P and STAGE 7-P. In other words, only the stage pulses STAGE 0-P and STAGE 7-P are permitted to appear without regard to the set value of the mode register 602. The stage pulse is preferably designed to have a pulse width of 1μ sec. All the elementary operations such as ignition control, fuel injection control, and detection of the engine stop are performed with the aid of the stage pulse.

REGISTER FILE (470, 472)

In FIG. 4, data sent from the CPU 114 is applied through the data bus 162 to a latch circuit 471 and stored at the timing of the clock pulse $\phi_2$. Then the data is applied to a first register file 470 and is stored at the timing of the clock pulse $\phi_1$ in the register selected by the register select signal REG SEL supplied from the CPU 114. The register file 470 includes a plurality of registers 402, 404, ... 428 as shown in FIG. 8A. These registers are designed to deliver the stored data by the application of the corresponding stage pulse thereto. By way of example, where the stage pulse CYL-P occurs at the output of the stage pulse latch circuit 572, the register 404 is selected to deliver its set data CYL REG as an output.

On the other hand, a second register file 472 includes a plurality of counters and timers 442, 444, ... 468 as shown in FIG. 8B, each of which counts up pulses indicative of engine operating conditions as of the instant in time during engine operation. In the same manner as described in connection with the first register file, one of the counter (timer) is selected to deliver its count value when the corresponding stage pulse is applied thereto. Thus, the selected one of registers of the first register file 470 and the selected one of counters or timers of the second register file 472 deliver respective set data which is applied to a comparator 480 and are compared with each other. The comparator 480 produces an output when the count value of the counter or timer becomes equal to or greater than the set value of the register. As will be appreciated from FIGS. 8A and 8B, when the stage pulse CYL-P appears for example, the contents of the register 404 and the counter 442 are compared with each other. Respective registers, counters, and timers are designed to have functions shown in the following table.

| Register Nos. | Functions of registers |
| --- | --- |
| 402 (ZERO REG) | It holds a digital value corresponding to the value of zero, and sends data representative of the zero value to the comparator by request. |
| 404 (CYL REG) | It holds the data CYL representative of a number which is determined by the number of cylinders. The data CYL is used to make a signal corresponding to, e. g., one revolution of crank angle. |
| 406 (INTL REG) | It holds data INTL representative of sensor position used for generating the reference signal INTLD and representative of the crank angle. With the data INTL, the reference signal PR from the sensor 98 is shifted to a predetermined crank angle position. |
| 408 (INTV REG) | It holds the data INTV representative of the period of time desired to be measured as the timer. When the data INTL is set, there is established e. g. the stage in which an interrupt signal can be delivered after the elapse of the period of time. |
| 410 (ENST REG) | It holds the data ENST representative of the predetermined period of time to be used for detecting the state in which the engine has stopped unexpectedly. |
| 412 (INJD REG) | It holds the data INJD representative of the valve opening time of the fuel injection valve. |
| 414 (ADV REG) | It holds the data ADV representative of the crank angle from the reference signal to the cutoff angle of the primary current of the ignition coil. |
| 416 (DWL REG) | It holds the data DWL representative of that crank angle from the immediately preceding reference signal to the initiation of the conduction of the primary current of the ignition coil in which the primary coil current is held in the cutoff state. |
| 418 (EGRP REG) | It holds the data EGRP representative of the period of the pulsating current signal EGR for controlling the valve opening degree of the EGR valve. |
| 420 (EGRD REG) | It holds the data EGRD representative of the pulse width of the pulsating current signal EGR for controlling the valve opening degree of the EGR valve. |
| 422 (NIDLP REG) | It holds the data NIDLP representative of the period of the signal NIDL of the pulsating current for controlling the air regulator which is disposed in order to control the quantity of air to flow bypassing the throttle chamber. |
| 424 (NIDLD REG) | It holds the data NIDLD representative of the pulse width of the pulsating current signal NIDL. |
| 426 (RPMW REG) | It holds the data RPMW representative of a fixed time to be used for detecting the engine rotational speed. |
| 428 (VSPW REG) | It holds the data VSPW representative of a fixed time to be used for detecting the vehicular speed. |
| 442 (CYL COUNT) | It holds the number of reference signal pulses having been generated. |
| 444 (INTL COUNT) | It holds the number of the crank angle pulses produced after the reference pulses from the angle sensor 98. |
| 446 (INTV TIMER) | It holds a value which is increased every certain time, e. g., 1024 microseconds when data is set into the INTV register 408. |
| 448 (ENST TIMER) | It holds a value which is increased every certain time, e. g., 1024 microseconds after the reference pulse from the angle sensor 98 has been entered. The content of this register 448 is returned to zero when the next reference pulse is entered. |
| 450 (INJ TIMER) | It holds a value which is increased periodically, e. g. every 8 microseconds, 16 microseconds, 32 microseconds, 64 microseconds, 128 microseconds and 256 microseconds. The selection of the fixed time is executed on the basis of the T register. |
| 452 (ADV COUNT) | It holds a value which is increased each time the signal PC representative of a fixed crank angle, e. g. 0.5 degree is provided from the angle sensor 98 after the reference signal has been delivered. |
| 454 (DWL COUNT) | It holds a value which is increased each time the crank angle signal PC is provided from the angle sensor 98 after the immediately preceding reference signal has been delivered. |
| 456 (EGR TIMER) | It holds a value which is increased after a fixed time has elapsed, e. g. 256 microseconds after the signal EGR-P has been delivered. |
| 458 (NIDL TIMER) | It holds a value which is increased after a fixed time has elapsed, e. g. 256 microseconds after the signal NIDL-P has been delivered. |
| 460 (RPMW TIMER) | It holds a value which is increased at a fixed time after the output pulse of the second register group 552 has been provided. |
| 462 (RPM COUNT) | It holds a value which is increased each time the angle signal PC representative of a fixed crank angle is provided |

| Register Nos. | Functions of registers |
|---|---|
| | from the angle sensor 98 after generation of the output pulse of the second comparison result holding register 552. |
| 464 (VSPW TIMER) | It holds a value which is increased at a fixed time after the output pulse of the second comparison result holding register 556 has been provided. |
| 468 (VSP COUNT) | It holds a value which is increased each time a pulse corresponding to the rotational speed of the wheels is produced after generation of the output pulse of the second comparison result holding register 556. |

Now, description will be made of the method of writing reference data into the first register file 470. The registers 402, 404, 406, and 410 are respectively set at the time of the beginning of operation of the present control apparatus. Once these registers are set, their set values are not altered. The writing of data into the register 408 is performed by the program processing.

The data INJD representative of the valve opening time of the fuel injector 66 is entered into the register 412. This data INJD is prescribed, for example, as follows: The output signal QA of the air flow meter 14 is applied to the analog/digital converter 124 through the multiplexer 122. It is converted into digital data and the digital data is held in a register (not shown). The load data TP is evaluated by calculating and processing the data representative of the quantity of suction air data or from information stored in the form of a map. Further, the outputs of the suction temperature sensor 16, water temperature sensor and atmospheric pressure sensor are subjected to digital conversion and corrections are made with the data and the running state of the engine. The correction coefficient may be $K_1$. Further, the battery voltage is digitalized and it is corrected according to the data. The coefficient of this correction is TS. Subsequently, a correction is made by an output of the λ sensor 80. The coefficient of the correction is α. That is, the data INJD is obtained from the following equation:

$$INJD = \alpha(K_1 \cdot TP + TS)$$

In this way, the valve opening time of the fuel injector is determined. However, the method here explained is only an example and it is, of course, possible to determine the valve opening time by any other method.

The data ADV representative of the ignition timing is loaded into the register 414. This data ADV is prepared as follows by way of example. Map-shaped ignition data θ IG, the factors of which are the load data TP and the number of revolutions, is held within a ROM 118 and a value is obtained from the map. Further, the θ IG is subjected to starting compensation, water temperature compensation, acceleration compensation, etc. Thus, the data ADV is derived.

In the register 416, the data DWL is set as data for controlling the charging time of the primary current of the ignition coil. This data DWL is calculated and obtained from the value of the data ADV and the digital value of the battery voltage.

In the registers 418 and 422 there are respectively set the data EGRP representative of the period of the signal EGR and the data NIDLP representative of the period of the signal NIDL. These data are predetermined.

In the register 420 the data EGRD representative of the conduction width of the EGR valve (exhaust gas recirculator) is stored. When the conduction width becomes great the valve opening degree of the exhaust gas recirculator increases and the recirculation rate of the exhaust gas increases. The data EGRD is held within the ROM 118 in, for example, a map state the factors of which are the load data TP and the rotational velocity. Further, this data is compensated according to the water temperature, etc.

Stored in the register 424 is the data NIDLD representative of the conduction width of the air regulator 48. This data is feedback-controlled so that, for example, the rotational velocity of the engine in the no-load state may become a predetermined one. It is stipulated as the quantity of feedback.

In the registers 426 and 428 data RPMW and VSPW representative of fixed times are respectively set when the circuit of this embodiment is started.

In the above explanation, the output of the air flow sensor has been used as the input factor for the controls of the fuel injection quantity, the advanced ignition angle, the exhaust gas recirculation quantity, etc. However, as the sensor representative of the state of the suction air, a sensor other than the air flow sensor can be used.

By way of example, a pressure sensor which detects the intake manifold pressure may be employed.

INCREMENTER (478)

The incrementer 478 receives control signals INC and RESET from a controller 490 and is designed to produce an output being equal to the set value of the latch circuit 476 plus one when the control signal INC is applied thereto and to produce an output of zero when the control signal RESET is applied thereto. Since the output of the incrementer 478 is applied to the second register file 472, the register of the second register file 472 functions as a timer or counter which counts up one by one in response to the control signal INC. The logic circuit of such incrementer is well known to those skilled in this art and therefore the details thereof will not be described in this specification. The output of the incrementer 478 is applied to the comparator 480 together with the output of the first register file 470. As described previously, the comparator 480 produces an output of the logical "1" when the output of the incrementer 478 becomes equal to or greater than the output of the first register file 470, otherwise it produces an output of the logical "0". The input to the incrementer 478 is set into a third register file 474 in synchronism with the clock pulse φ when a control signal MOVE is applied to the register file 474. The set data of the third register file 474 can be transferred through the data bus 162 to the CPU 114.

Precisely stated, the incrementer 478 has three functions as follows. The first is an increment function by which the input data to the incrementer 478 is added by one. The second is a non-increment function by which the input data to the incrementer 478 is passed therethrough without any operation of the addition. The third is a reset function by which the input to the incrementer 478 is changed to zero so that the data indicative of zero is delivered therefrom at all times without regard to its input value.

As mentioned previously, when one of the registers is selected from the second register file 472, the data stored in the selected register is applied through the latch circuit 476 to the incrementer 478 whose output is fed back to the selected register so that the contents of the selected register are refreshed. As a result, where the incrementer 478 offers the increment function by which the input thereof is increased by one, the selected register of the second register file functions as a counter or timer.

In the closed loop including the register file 472, latch circuit 476 and incrementer 478, if such an operating condition occurs that the output of the incrementer 478 begins to be set into the second register file 472 while the contents of the register file 472 are being delivered, the error of the counting operation will be caused at the register file 472. To eliminate such an error, the latch circuit 476 is provided to separate in time between the data flow from the file register 472 to the incrementer 478 and the data flow from the incrementer 478 to the file register 472.

The latch circuit 476 is applied with the clock pulse $\phi_2$ and is permitted to receive data from the register file 472 during the period of time that the clock pulse $\phi_2$ appears, as shown in FIG. 7. On the other hand, the register file 472 is applied with the clock pulse $\phi_1$ and is permitted to receive data from the latch circuit 476 through the incrementer 478 during the period of time that the clock pulse $\phi_1$ appears. As a result, there will be no interference between data flows delivered from and applied to the second register file 472.

COMPARATOR (480):
A GROUP OF REGISTERS (502,504):
OUTPUT LOGIC CIRCUIT (503):

Like the incrementer 478, the comparator 480 operates in no synchronism with the clock pulses $\phi_1$ and $\phi_2$. Inputs of the comparator 480 are the data delivered from the selected register of the register file 470 and the data delivered from the selected counter or timer through the latch circuit 476 and the incrementer 478. The output signal of the comparator 480 is applied to a first register group including a plurality of latch circuits and is set to the selected latch circuit in synchronism with the clock pulse $\phi_1$. The data thus written into the first register group is then shifted to a second register group in synchronism with the clock pulse $\phi_2$. An output logic circuit 503 receives the data set in the second register group to produce output signals for driving the fuel injector, ignition coil, exhaust gas recirculating device and the others. This output circuit 503 includes a logic circuit shown at the reference numeral 710 in FIG. 18, the operation of which will be described later. The first and second register groups include a plurality of latch circuits 506, 510, . . . 554 and 508, 512, . . . 556, respectively, as shown in FIG. 10. Functions of these latch circuits (or registers) are described in the following table.

| | |
|---|---|
| 506 (CYLFF) | "1" is set herein upon condition that data of the register 404 ≦ data of the counter 442. |
| 508 (CYLBF) | The signal of the register 506 is set herein at the timing of the clock $\phi_2$. |
| 510 (INTLFF) | "1" is set herein upon condition that data of the register 406 ≦ data of the counter 444. |
| 512 (INTLBF) | The signal of the register 510 is set herein under the condition of the clock $\phi_2$. |
| 514 (INTVFT) | "1" is set herein upon condition that data of the register 408 ≦ data of the timer 446. |
| 516 (INTVBF) | The signal of the register 514 is set herein under the condition of the clock $\phi_2$. |
| 518 | "1" is set herein upon condition that data of the |
| (ENSTFF) | register 410 ≦ data of the timer 448. |
| 520 (ENSTBF) | The signal of the register 518 is set herein under the condition of the clock $\phi_2$. |
| 522 (INJFF) | "1" is set herein upon condition that data of the register 412 ≦ data of the timer 450. |
| 524 | The signal of the register 522 is set herein under the condition of the clock $\phi_2$. |
| 526 (ADVFF) | "1" is set herein upon condition that data of the register 414 ≦ data of the counter 452. |
| 528 (ADVBF) | The signal of the register 526 is set herein under the condition of the clock $\phi_2$. |
| 530 (DWLFF) | "1" is set herein upon condition that data of the register 416 ≦ data of the counter 454. |
| 532 (DWLBF) | The signal of the register 530 is set herein at the timing of the clock $\phi_2$. |
| 534 (EGRPFF) | "1" is set herein upon condition that data of the register 418 ≦ data of the timer 456. |
| 536 (EGRPBF) | The signal of the register 534 is set herein at the timing of the clock $\phi_2$. |
| 538 (EGRDFF) | "1" is set herein upon condition that data of the register 420 ≦ data of the timer 456. |
| 540 (EGRDBF) | The signal of the register 538 is set herein at the timing of the clock $\phi_2$. |
| 542 (NIDLPFF) | "1" is set herein upon condition that data of the register 422 ≦ data of the timer 458. |
| 544 (NIDLPBF) | The signal of the register 542 is set herein at the timing of the clock $\phi_2$. |
| 546 (NIDLDFF) | "1" is set herein upon condition that data of the register 424 ≦ data of the timer 458. |
| 548 (NIDLDBF) | The signal of the register 546 is set herein at the timing of the clock $\phi_2$. |
| 550 (RPMWFF) | "1" is set herein upon condition that data of the register 426 ≦ data of the register 460. |
| 552 (RPMWBF) | The signal of the register 550 is set herein at the timing of the clock $\phi_2$. |
| 554 (VSPWFF) | "1" is set herein upon condition that data of the register 428 ≦ data of the timer 464. |
| 556 (VSPWBF) | The signal of the register 556 is set herein at the timing of the clock $\phi_2$. |

Figure 16:
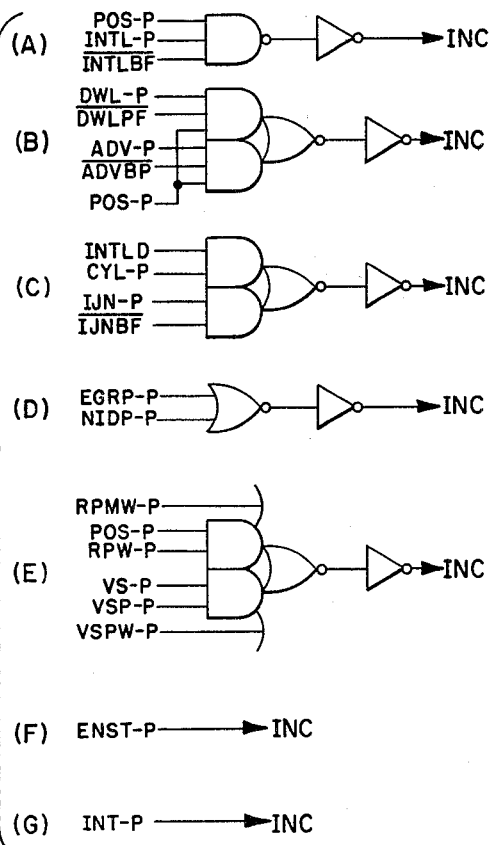
FIG. 16 is a schematic diagram showing a logic circuit for producing an increment control signal.
Figure 17:
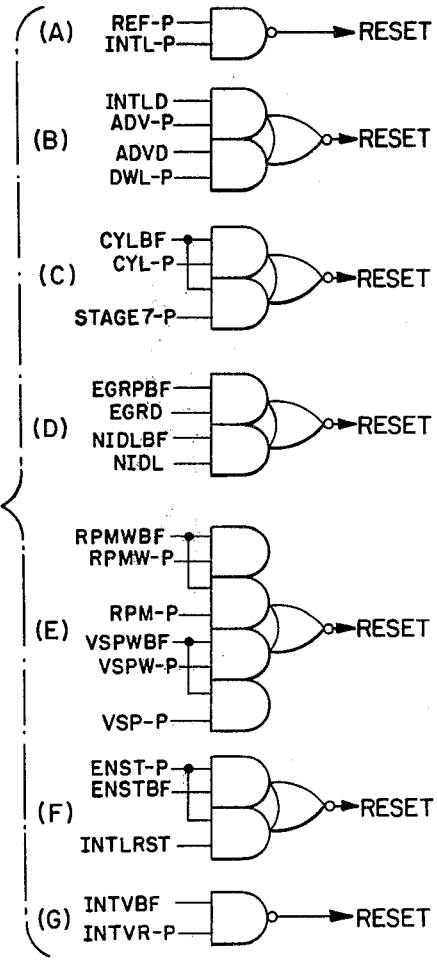
FIG. 17 is a schematic diagram showing a logic circuit for producing a reset signal.

INCREMENTER CONTROL CIRCUIT (490):

The incrementer control circuit 490 includes logic circuits shown in FIGS. 16 and 17 and produces control signals INC, RESET, MOVE for the control of the incrementer 478. The operation and details of the incrementer control circuit 490 will be described later.

STATUS REGISTER (477):
MASK REGISTER (475):

The status register 477 is provided to indicate whether or not there are interrupt requests due to the engine stop ENST, the termination of A-D converter operation and the others. The mask register 475 is adapted to receive data sent through the data bus from the CPU 114. Depending upon the data received, the mask register 475 functions to control the inhibition or admission of sending interrupt request signal IRQ to the CPU 114 when such interrupt request has occured.

INPUT SIGNAL SYNCHRONIZER CIRCUIT (128):

This circuit 128 receives sensed pulses indicative of, for example, the rotational speed of the engine and a vehicular speed and produces an output pulse synchronized with the clock pulse $\phi_1$ or $\phi_2$. The pulses sensed and applied to the synchronizer circuit 128 are a reference signal PR which is generated every revolution of the engine, an angle signal PC produced each time the engine rotates a predetermined angle and a pulse PS indicative of the vehicle running speed. The intervals of these pulses change greatly depending on, for example, the vehicular speed and are not synchronized with the clock pulses $\phi_1$ and $\phi_2$. In order to use these pulses PR, PC, and PS for the control of the incrementer 478 the sensed pulses are necessary to be synchronized with the stage pulse. Further, the angle signal PC and the vehicular speed signal PS are to be synchronized at both the rising portions and falling portions with the stage pulse for the improvement of detection accuracy while the reference signal PR may be synchronized at its rising with the stage pulse.

Figure 11:
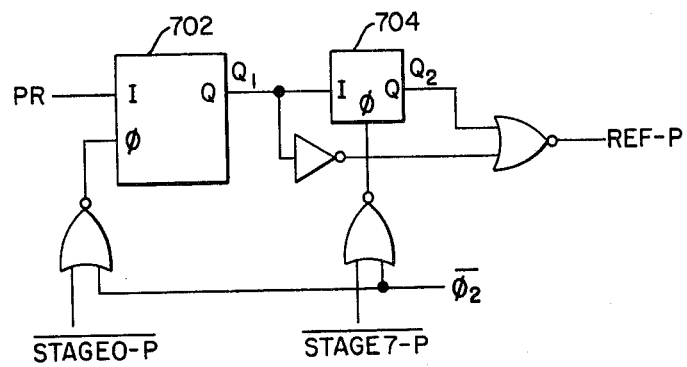
FIG. 11 is a diagram of a logic circuit for producing a reference signal.
Figure 12:
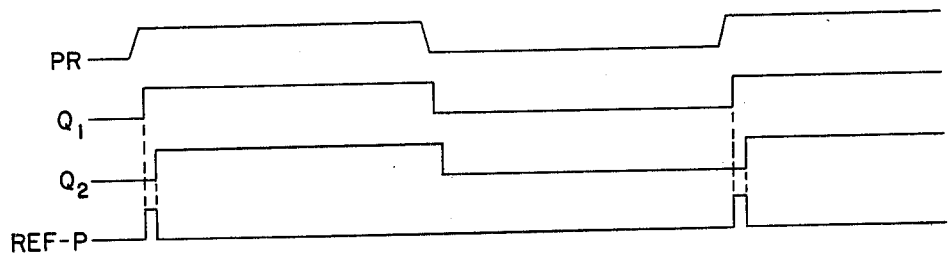
FIG. 12 shows waveforms of signals appearing at respective points of the logic circuit shown in FIG. 11.

In FIG. 11, showing a logic diagram of a synchronizer circuit for the reference signal PR, the sensed signal PR is applied to a terminal I, and the inverted clock pulse $\overline{\phi_2}$ as well as the inverted stage pulse $\overline{\text{STAGE 0-P}}$ are applied through NOR logic circuit to a terminal $\phi$ of a latch circuit 702. The latch circuit 702 produces, at a terminal Q, an output pulse shown at $Q_1$ in FIG. 12. Another latch circuit 704 receives at its terminal I the pulse $Q_1$ and at its terminal the inverted clock pulse $\overline{\phi_2}$ together with the inverted stage pulse $\overline{\text{STAGE 7-P}}$ through NOR logic circuit. As a result, the latch circuit 704 produces an output shown at $Q_2$ in FIG. 12. A synchronized reference pulse REF-P is produced from the output $Q_2$ and the inverted output $\overline{Q_1}$ as shown at REF-P in FIG. 12.

Figure 13:
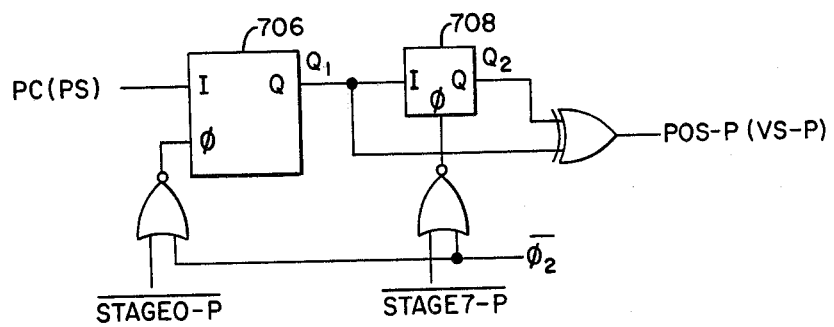
FIG. 13 is a diagram of a logic circuit for producing an angle signal.
Figure 14:
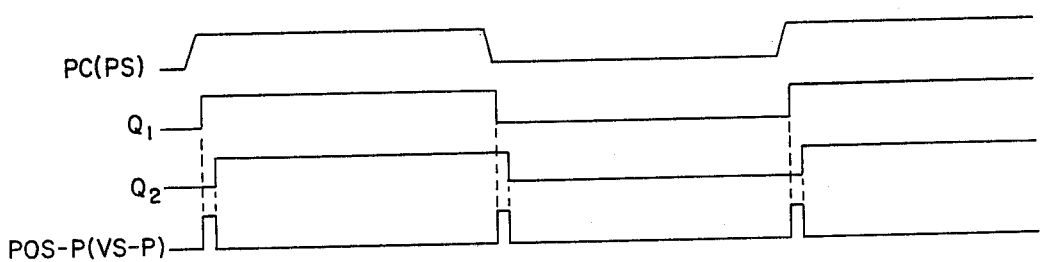
FIG. 14 shows waveforms of signals appearing at respective points of the logic circuit shown in FIG. 13.

In FIG. 13, showing a synchronizer circuit for the angle signal PC and the vehicular speed signal PS, the sensed signal PC (or PS) shown in FIG. 14 is applied to a terminal I while the inverted clock pulse $\overline{\phi_2}$ and the inverted stage pulse $\overline{\text{STAGE 0-P}}$ are applied through NOR logic circuit to a terminal $\phi$ of a latch circuit 706. Obtained from a terminal Q of the latch circuit 706 is signal $Q_1$ shown in FIG. 14, which is applied to a terminal I of a latch circuit 708. The output $Q_1$ and $Q_2$ of the latch circuits 706 and 708 are applied to an exclusive OR logic circuit to generate a synchronized signal POS-P (or VS-P).

OPERATION:

(1) Producing a Reference Pulse INTLD

Figure 15:
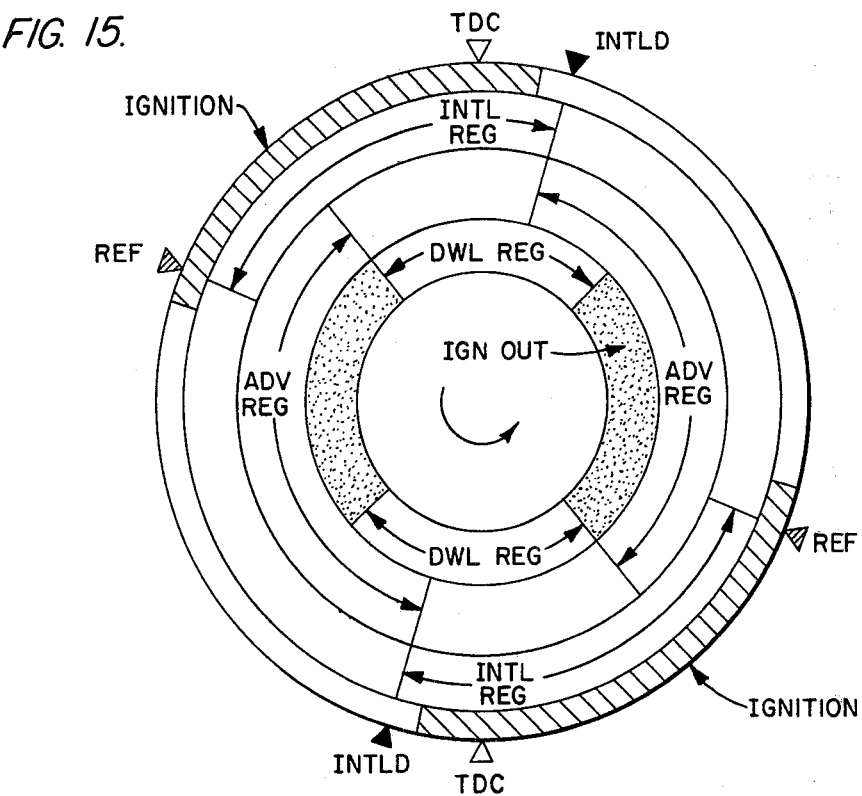
FIG. 15 is a schematic diagram for explaining operation of the engine control system.
Figure 18:
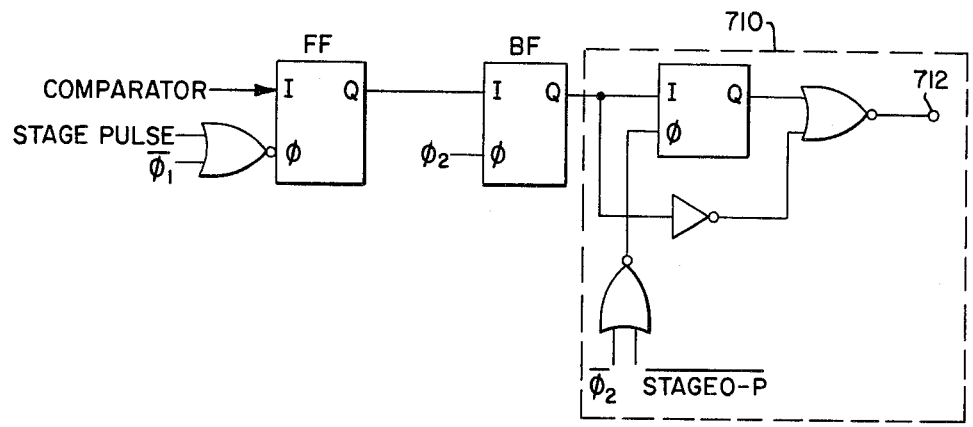
FIG. 18 shows a diagram of an output logic circuit.
Figure 19:
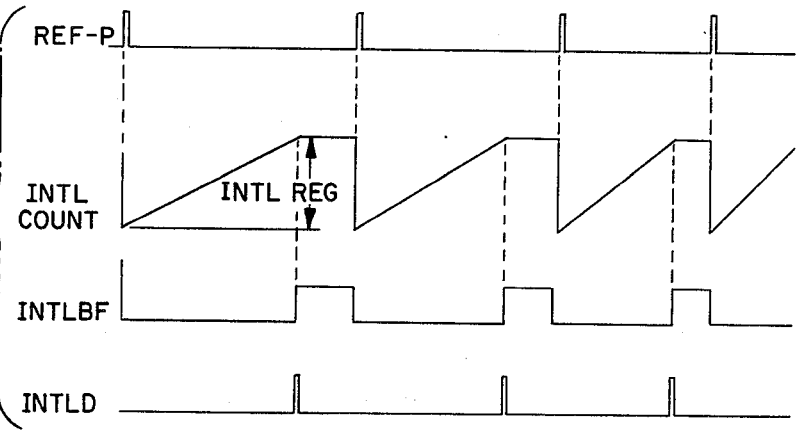
FIGS. 19, 20 and 21 show waveforms for explanation of the operation of the engine control apparatus.

For the controls of ignition timing, fuel injection and the detection of the engine stop, it is necessary to produce the reference pulse INTLD which is delayed by the angle corresponding to the value INTL set in the register 406 from the pulse PR obtained by means of a crank angle sensor, as shown in FIG. 15. It should be noted that FIG. 15 illustrates the case of a four cylinder engine in order to simplify the drawing. This pulse INTLD serves to set the reference point for the controls such as the ignition timing. The reference point is set at the position spaced by a predetermined angle from the top dead center of the engine, so that the ignition can take place at the predetermined timing irrespective of the mounting position of the crank angle sensor. When the stage pulse generator 570 produces the stage pulse INTL-P, the register 406 of the first register file 470 and the counter 444 of the second register file 472 are selected for the operation of comparison, as seen from FIGS. 8A and 8B. At the same time, the incrementer controller 490 produces the increment control signal INC by means of the logic circuit shown in FIG. 16(A) and the reset signal RESET by means of the logic circuit shown in FIG. 17(A). Both the increment control signal INC and the reset signal RESET are applied to the incrementer 478. The counter 444 counts up the stage pulse POS-P so that the resulted count value increases gradually as shown at INTL COUNT in FIG. 19. When the count value INTL COUNT of the counter 444 becomes equal to or greater than the set value INTL REG of the register 406, that is, INTL REG ≦ INTL COUNT, the comparator 480 produces an output which is applied to the latch circuit 510 of the first register group 502, and then to the latch circuit 512 of the second register group 504 as shown in FIG. 10. The logic circuit shown at a reference number 710 in FIG. 18 is connected to the output of the latch circuit 512 so that the reference pulse INTLD shown in FIG. 19 can be obtained at an output terminal 712 of the logic circuit 710. It is noted in FIG. 19 that the pulse $\overline{\text{INTLBF}}$ used for producing INTLD pulse is an output from the latch circuit 512 of FIG. 10.

As can be seen from FIG. 16(A), not only the stage pulses POS-P, INTL-P, but also the inverted output $\overline{\text{INTLBF}}$ of the latch circuit 512 are utilized for producing the increment control signal INC so that the counter 444 will terminate its counting operation when the condition of (INTL COUNT)≦(INTL REG) is detected by the comparator 480. Reasons for the necessity for the termination of the counting operation are as follows. In the case of a four cylinder engine, the reference pulse REF-P is produced once every 180° of the crank shaft movement. If the crank angle sensor is designed to generate pulses POS-P every 0.5° of angular movement of the crank shaft, the number of pulses POS-P becomes more than 360 between two adjacent reference pulses REF-P. Since the counter 444 is usually designed to have eight bits, the above-mentioned number of reference pulse REF-P is great enough to cause overflow in the counter 444, thereby producing another pulse INTLD at the undesired timing. The use of the output pulse $\overline{\text{INTLBF}}$ for producing the increment control signal serves to prevent the producing of such undesired reference pulse.

(2) Ignition Control

In the operation of the ignition control, a control signal IGN out is produced which flows through the ignition coil. For this control, data ADV indicative of the ignition timing and data DWL indicative of the nonconductive period of time of the ignition coil are supplied from the CPU 114 and set into the registers 414 and 416, respectively. FIG. 15 shows the relationship between the set value ADV REG of the register 414 and the set value DWL REG of the register 416. The set value ADV REG serves to define a spark advance indicating the position of the crankshaft at which an ignition spark is to occur after (or before) the piston reaches its top dead center position, while the set value DWL REG indicates the magnitude of the crank angle during which the ignition coil is rendered non-conductive.

Figure 20:
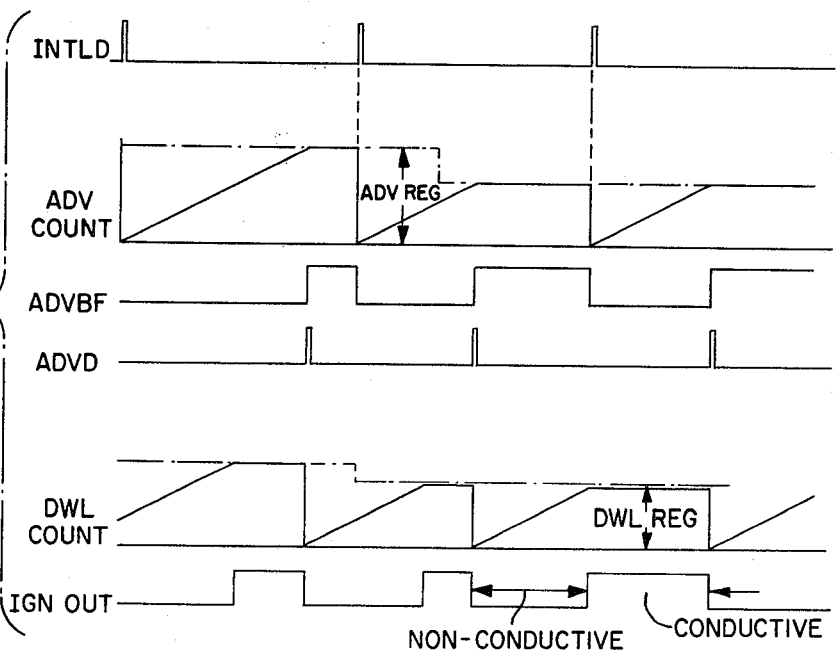

When the stage pulse ADV-P is delivered from the stage pulse generator 570, and applied to the first and second register files 470, 472, the register 414 and counter 452 are selected for operation, as shown in FIGS. 8A and 8B. At the same time, the stage pulse ADV-P is applied to the incrementer controller 490 in which an increment control signal INC is produced by a logic circuit shown in FIG. 16(B) and a reset signal RESET is produced by a logic circuit shown in FIG. 17(B). By the application of the increment signal INC to the incrementer 478, the incrementer 478 functions to add "1" with the value set in the latch circuit 476 and delivers the resultant value to the second register file 472, so that the counter 452 of the second register file 472 counts up the synchronized angle pulses POS-P. When the count value ADV COUNT of the counter 452 becomes equal to or greater than the set value ADV REG of the register 452, the comparator 480 produces an output which is applied to a latch circuit 526 of the first register group 502 shown in FIG. 10. An output of the latch circuit 526 is applied to another latch circuit 528 and then to an output logic circuit 710 shown in FIG. 18. The logic circuit 710 (FIG. 18) functions to produce an output pulse ADVD shown in FIG. 20 from the output ADVBF of the latch circuit 528. This output pulse ADVD is used for producing a reset signal in DWL-P stage (FIG. 17(B)). When the stage pulse DWL-P is delivered from the stage pulse generator 570, the register 416 of the first register file 470 and the counter 454 are selected for operation as can be seen from FIGS. 8A and 8B. In the incrementer controller 490, the increment control signal INC and the reset signal RESET are produced by logic circuits shown in FIGS. 16(B) and 17(B), respectively. As a result, the counter 454 increases its count value in accordance with the pulse POS-P and remains at a constant value upon reaching the set value DWL REG of the register 416 and is then reset by the aforementioned pulse ADVD as shown in FIG. 20. The comparator produces an output signal which is rendered in the on-state during the count value DWL COUNT being equal to the set value DWL REG. As a result, the latch circuit 532 delivers an output pulse shown at IGN out in FIG. 20, which is supplied to the ignition coil.

Figure 21:
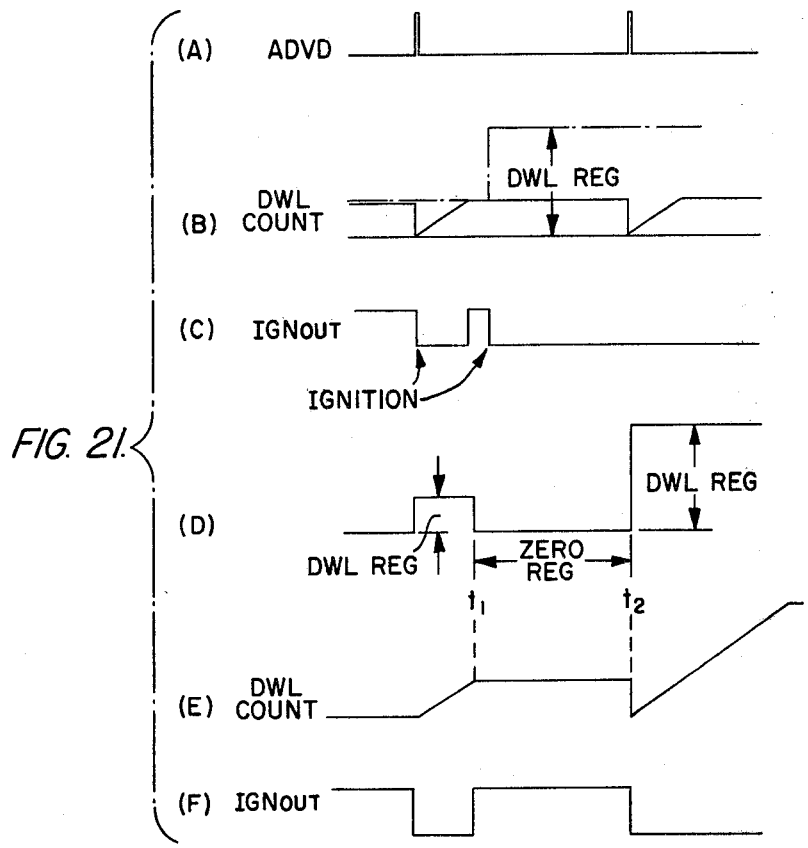
Figure 22:
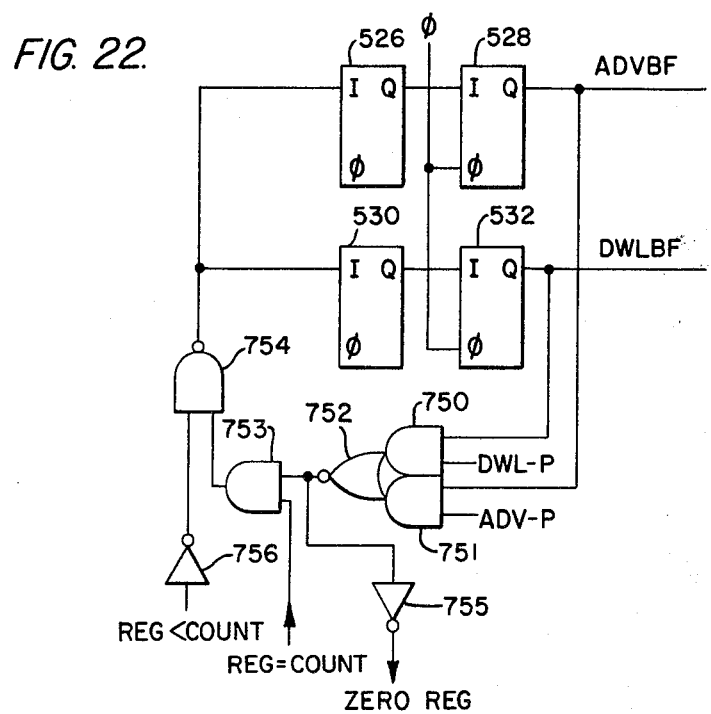
FIG. 22 is a diagram of a logic circuit provided as one part of the output logic circuit.

It should be noted that the data DWL REG from the CPU 114 to be set in the register 416 may change abruptly at a time between ADVD pulses as shown in FIG. 21. In the event the set data DWL REG of the register 416 is caused to change shortly after the count value DWL COUNT of the counter 454 has reached the set value DWL REG as shown in FIG. 21(B), this change will terminate the output signal IGN out, thereby producing a narrow width pulse IGN out as shown in FIG. 21(C). As can be seen from FIG. 15, the ignition takes place when the output signal IGN out is terminated. However, where the output pulse IGN out is narrow in width so that the ignition coil cannot store enough energy for the ignition, a misfiring will be caused. In order to prevent such misfiring, the present invention provides a logic circuit shown in FIG. 22, including AND gates 750, 751, 753, NOR gate 752, and NAND gate 754. In FIG. 22 the output ADVBF of the latch circuit 528 and the stage pulse DWL-P are applied to the AND gate 750 while the output DWLBF of the latch circuit 532 and the stage pulse ADV-P are applied to the AND gate 751. Both the AND gates 750 and 751 are connected with the NOR gate 752 whose output is applied, as a register select signal, through an inverter 755 to a zero register 402 shown in FIG. 8A. The zero register 402 is ready to deliver a zero output when the register select signal is applied from the NOR gate 752. The AND gate 753 is applied with the output of the NOR gate 752 together with an output signal produced by the comparator 480 when the count value becomes equal to the set value. The NAND gate 754 receives as its inputs the output signal from the AND gate 753 as well as the output of the comparator 480. The comparator produces an output when the count value becomes greater than the set value. By using this logic circuit, once the counter value DWL COUNT of the counter 454 reaches the set value DWL REG of the register 416, the zero register 402 is selected in place of the register 416 to deliver its zero output through data bus to the comparator 480 until the counter 454 is reset. As a result, the count value DWL COUNT becomes greater than the output of the zero register 402 so that he comparator 480 produces a "1" output thereafter without regard to changes in the value DWL REG to be set into the register 416. Accordingly, the latch circuit 532 produces an output signal shown in FIG. 21(F), which includes no narrow pulse so that no misfiring will take place at the ignition.

(3) Fuel Injection Control

In operation of the fuel injection control, the timing of the fuel injection relative to the ignition timing and the others is shown in FIG. 2. As will be appreciated from FIG. 2, the fuel injection takes place once every revolution of the engine at the same time for all the cylinders.

Figure 23:
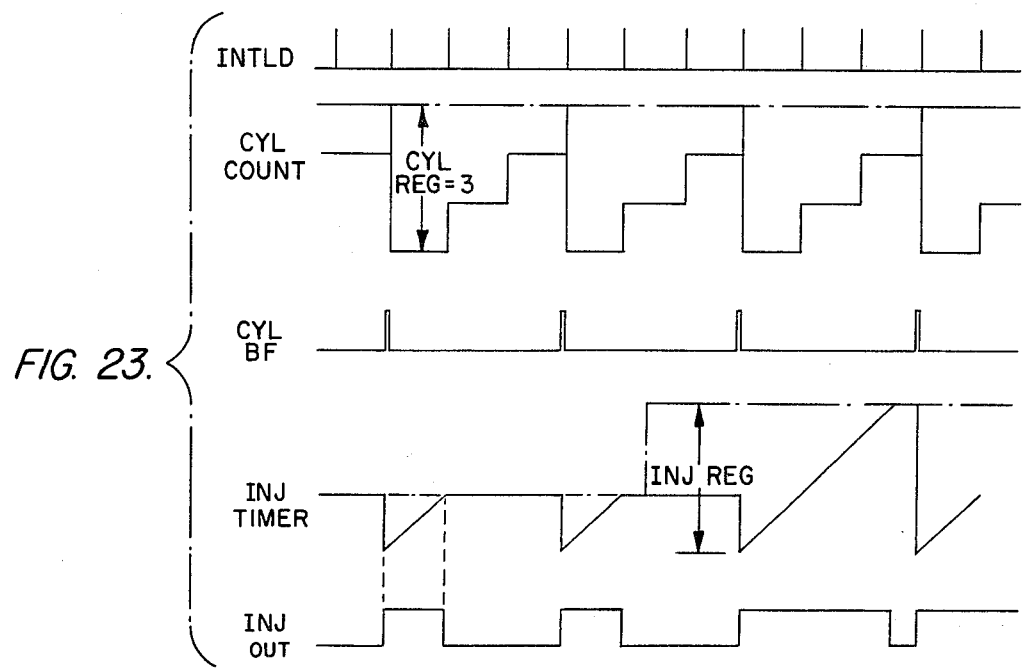
FIGS. 23, 24, 25 and 26 show waveforms for explanation of the operation of the engine control apparatus.

When the stage pulse CYL-P is delivered from the stage pulse generator 570, such pulse serves to select the register 404 of the first register file 470 and the counter 442 of the second register file 472. The register 404 is preliminarily set with a constant value CYL REG which is, for example, equal to 2 in the case of a four cylinder engine, 4 in the case of a six cylinder engine. By the application of the stage pulse CYL-P to the increment control circuit 490, the control circuit 490 produces an increment control signal INC and a reset signal RESET by means of logic circuits shown in FIGS. 16(C) and 17(C), respectively. As a result, the count value CYL COUNT of the counter 444 varies in accordance with the pulse INTLD as shown in FIG. 23 and when the count value CYL COUNT of the counter 444 reaches a value equal to the set constant number CYL REG, the latch circuit 508 produces an output shown at CYLBF in FIG. 23.

Following the above-mentioned stage, when the next stage pulse INJ-P is produced, the register 412 of the first register file 470 and the timer 450 of the second register file 472 are selected for operation of the comparison. At the same time, the incrementer 490 is given an increment countrol signal INC and a reset signal RESET produced by logic circuits shown in FIGS. 16(C) and 17(C), respectively. With the aid of the incrementer 478, the timer 450 increases its value until the value becomes equal to the set data INJ REG of the register 412 and is reset by the aforementioned pulse CYLBF. The comparator 480 delivers an output signal during the condition of INJ TIMER $\geq$ INJ REG being met. Since the output logic circuit 710 shown in FIG. 18 is connected with the latch circuit 524 to which the comparator output is applied through the latch circuit 522, an injection control signal shown at INJ out can be obtained at the output terminal 712 of the output logic circuit 710. The reason why the timer 450 is designed to terminate its counting operation when the count value INJ COUNT becomes equal to the set value INJ REG of the register 412 is to prevent the timer 450 from overflowing in its count value just like the case of the ignition control. In order to prevent this overflow and erroneous fuel injection, it is desirable to connect such a logic circuit as shown in FIG. 22 to the output stage of the latch circuit 524. The presence of the injection control signal INJ out is set at the bit of 2° in the status register 477 in synchronism with the clock pulse $\phi_1$ so that the CPU 114 may be informed of the condition of the injection control signal INJ out, if necessary.

(4) EGR and NIDL Controls

Figure 24:
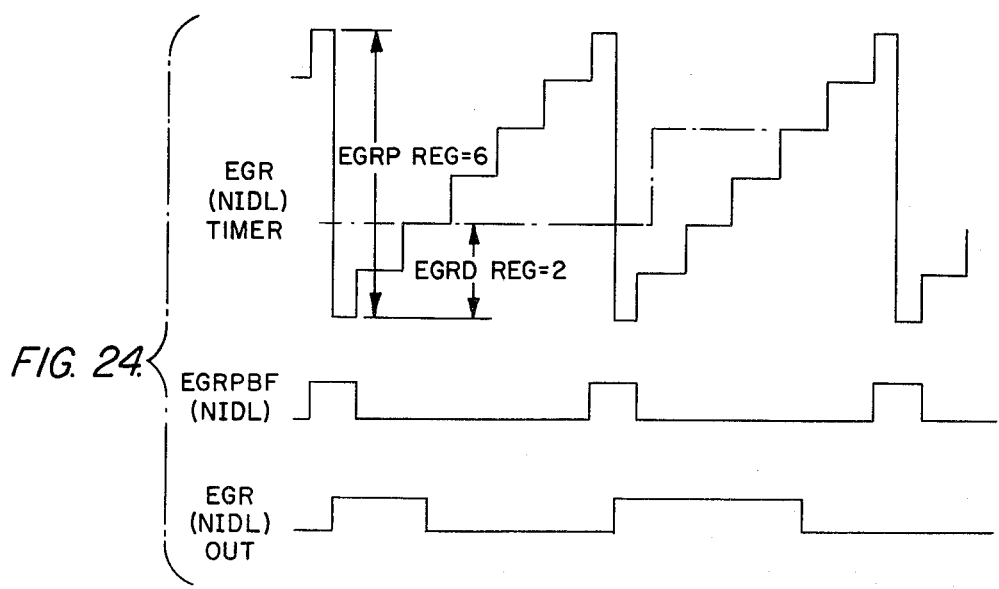

EGR control is defined as adjusting the value 28 to enable the suitable amount of exhaust recirculating gas to be entered into the intake manifold 26 and NIDL control is defined as adjusting the screw 44 or a value at the idling operation to permit the suitable amount of air to be entered into the intake manifold 26. Both controls are so called a duty control by which the pulse width of an output is changed while the interval of the output pulses remains unchanged. In order to set the width of the value control pulse registers 420 and 424 are provided. The registers 418 and 422 are provided to set the internal of the output pulses. Since the basic operation of the EGR control is substantially the same as that of the NIDL control, the description will be hereinafter made of the EGR control. By the stage pulse EGRP-P, the register 418 of the first register file 470 and timer 456 of the second register file 456 are selected for operation of the comparison and the incrementer 478 is applied with an increment control signal INC which is produced by means of a logic circuit shown in FIG. 16(D). As a result, the timer 456 counts up the stage pulse EGRP-P and produces an output signal shown at EGR TIMER in FIG. 24. When the count value EGR TIMER becomes equal to or greater than the set value EGRP REG, the latch circuit 536, applied with an output from the comparator 480 through the latch circuit 534, produces a signal shown at EGRPBF in FIG. 24. This signal, EGRPBF, serves together with the pulse EGRD to produce a reset signal at a control stage EGR-P. The timer 456 is commonly used at both the control stages EGR-D and EGR-P. When the count value EGR TIMER of the timer 456 becomes equal to or greater than the set value EGRD REG of the register 420, the comparator 480 produces an output which is applied to a latch circuit 538 and then to a latch circuit 540. The latch circuit 540 delivers an output signal shown at EGR out in FIG. 24. The opening and closing of EGR value are controlled in response to the output signal EGR out thus obtained.

(5) Measurements of the Revolutions of the Engine and the Vehicular Speed.

The revolutions per unit time of the engine are measured by counting, for the predetermined period of time, the number of pulses POS-P detected by means of the crank angle sensor mounted on the crankshaft. The measurement of the vehicular speed is performed by counting for the predetermined period of time the output pulses sensed by the vehicular speed sensor. Both the measurements are substantially the same in principle, therefore the description will be made of the measurement of the revolutions per minute of the engine.

Figure 25:
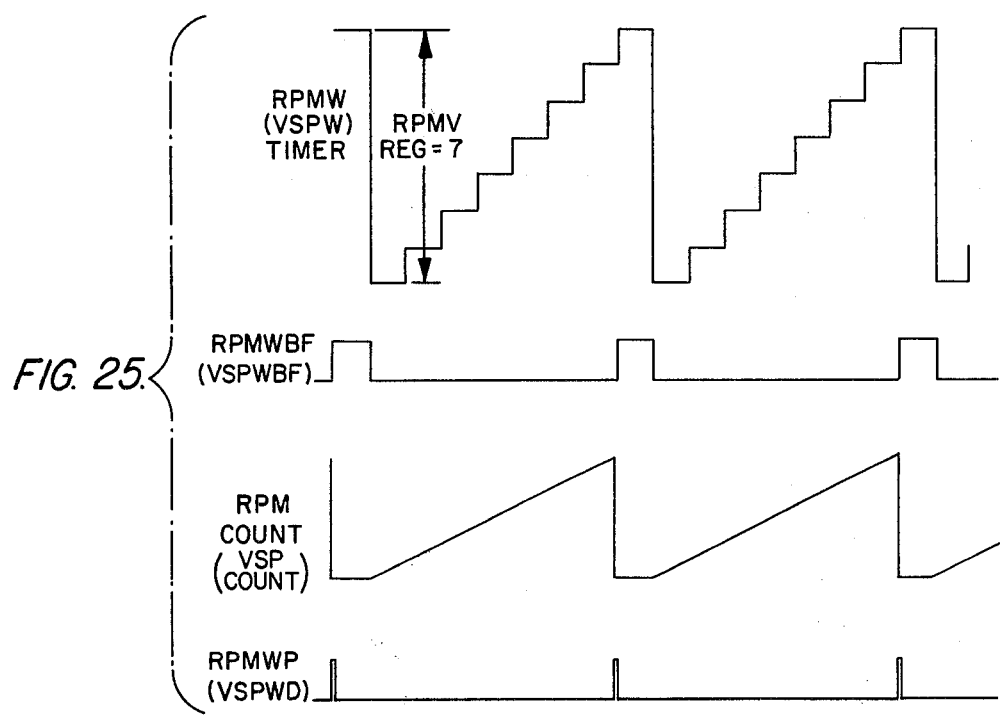

When the stage pulse RPMW-P is delivered from the microstage generator 570, the register 426 of the first register file 470 and the timer 460 of the second register file 472 are selected for operation. Upon the application of the stage pulse RPMW-P to the incrementer control circuit 490, it produces an increment control signal INC by means of a logic circuit shown in FIG. 16(E), and a reset signal RESET by means of a logic circuit shown in FIG. 17(E), both of which are applied to the incrementer 478. As a result, the timer 460 increases its count value RPMW TIMER as shown in FIG. 25. The register 426 is preliminarily set with the number of 7. When the count value RPMW TIMER of the timer 460 becomes equal to or greater than the set value RPMW REG of the register 426, the comparator 480 delivers an output which is applied to the latch circuit 550 and then shifted to the latch circuit 552. Shown at RPMWBF in FIG. 25 is one output of the latch circuit 552 which is applied to the logic circuit shown in FIG. 17(E) for producing the reset signal. Since the output logic circuit 710 shown in FIG. 18 is connected to the output stage of the latch circuit 552, an output pulse RPMWD appears at the terminal 712 of the output logic circuit 710.

When the stage pulse PRM-P is delivered, the counter 462 of the second register file 472 is selected. This counter 462 counts the pulses POS-P between two adjacent stage pulses PRM-P so that the count value RPM COUNT (VSP count) of the counter 462 increases as shown in FIG. 25. The count value RPM COUNT will be transferred to the third register file 474 in synchronism with a control signal MOVE produced by the incrementer control circuit 490. The set data in the third register file 474 will be transferred by way of the data bus 162 to the CPU 114.

(6) Detection of the Engine Stopping

When the revolutions of the engine become lower than a predetermined value, in other words, that the interval of the reference pulse INTLD becomes greater than the set value ENST REG of the register 410 of the first register file 470, the CPU 114 is informed by an interrupt signal of the fact that the engine will soon stop. In normal operation, the reference pulse INTLD is predetermined in cycle or interval to be less than the set value of the register 410. In the event the CPU 114 receives an interrupt signal indicating that the engine will stop, the CPU 114 generates an instruction signal for the stops of the operation of the fuel pump and other necessary elementary operations.

Figure 26:
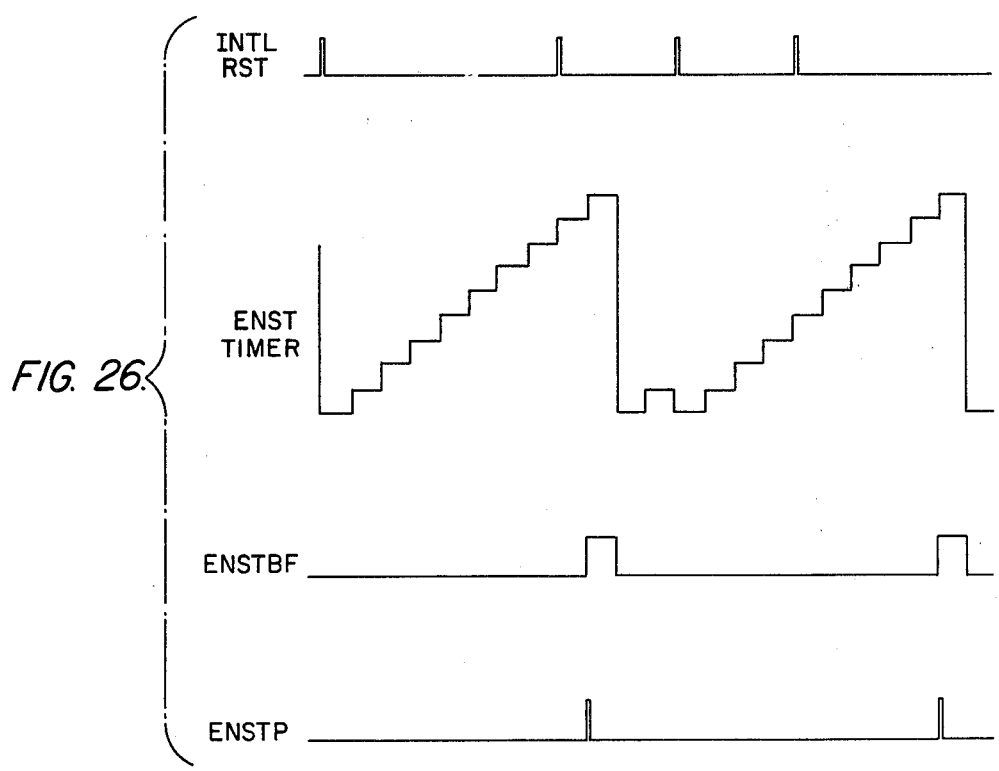

When the microstage generator 570 produces the stage pulse ENST-P, the register 410 of the first register file 470 and the timer 448 of the second register file 472 are selected for operation. At the same time, the incrementer 478 is applied with the stage pulse ENST-P as an increment control signal INC, as shown in FIG. 16(F), and a reset signal RESET produced by means of a logic circuit shown in FIG. 17(F). The timer 448 operates to count up the stage pulses ENST-P so that the count value ENST TIMER varies as shown in FIG. 26. As a consequence, a latch circuit 520 connected to the comparator through the latch circuit 518 delivers an output shown at ENSTBF in FIG. 26. By the connection of the same logic circuit 710 as in FIG. 18 to the output stage of the latch circuit 518, an output pulse ENSTD indicating the condition of the engine stop can be obtained at the terminal 712 of the logic circuit 710. In normal operation, the timer 448 is reset by a pulse INTLRST shown in FIG. 26. This pulse INTLRST is produced with the reference pulse INTLD being made in synchronism with the stage pulse ENST-P. When the engine is near the condition of stop, the timer 448 is reset by the output ENSTBF of the latch circuit 518 and the above-mentioned pulse INTLRST. The interval between the pulse INTLRST and the output pulse ENSTD is referred to as a so-called ENST time.

Since various changes in the control apparatus embodied in the present invention may be made without departing from its spirit and scope, it is intended that all matters in the above description shall be considered as illustrative and not in a limiting sense.

We claim:

1. In a processor-controlled apparatus for controlling the operation of an internal combustion engine for which sensor means produce signals representative of operating conditions of the engine, and being coupled to actuator means for controlling respective energy conversion functions of said engine in response to control signals applied thereto, a control apparatus comprising, in combination:

first means for generating an engine control timing signal pattern through which operational events of said engine are controlled;

second means for storing predetermined engine control codes;

third means, coupled to said first means, for generating respective engine timing codes the values of which are selectively modified by said engine control timing pattern;

fourth means, coupled to said second and third means, for comparing respective ones of said engine control codes with respective ones of said engine timing codes and producing respective output signals when said respective engine control codes define a prescribed relationship with respect to said engine timing codes;

fifth means, coupled to said fourth means, for producing control signals to be coupled to said actuator means in response to the output signals produced by said fourth means; and sixth means, coupled to said third and fourth means, for causing said fourth means to compare a respective engine timing code with a preselected engine control code in response to said fourth means producing an output signal associated with said respective engine timing code.

2. A control apparatus according to claim 1, wherein said sixth means further includes means for preventing the value of said respective engine timing code from being modified in response to said fourth means producing said output signal associated with said respective engine timing code.

3. A control apparatus according to claim 1, wherein the value of said preselected engine control code is such as to define said prescribed relationship with respect to said respective engine timing code irrespective of the value of said respective engine timing code.

4. A control apparatus according to claim 1, wherein said preselected engine control code is stored by said second means.

5. A control apparatus according to claim 4, wherein the value of said preselected engine control code is zero.

6. A control apparatus according to claim 1, wherein said prescribed relationship is such that the value of a respective engine timing code is greater than or equal to the value of a corresponding respective engine control code.

7. A control apparatus according to claim 1, wherein said third means comprises:
a first plurality of storage devices for storing respective engine timing codes, and
means, coupled to said first plurality of storage devices, for controllably modifying the engine timing codes in accordance with said engine control timing pattern.

8. A control apparatus according to claim 7, wherein said second means comprises a second plurality of storage devices for storing respective engine control codes, said fourth means being selectively coupled to compare the contents of respective ones of said first plurality of storage devices with respective ones of said second plurality of storage devices in accordance with said engine control timing signal pattern.

9. A control apparatus according to claim 8, wherein said second means includes a further storage device for storing said preselected engine control code, said fourth means being responsive for the output of said sixth means to compare the contents of said further storage device with the contents of that one of said first plurality of storage devices in which said respective engine timing code is stored.

10. A control apparatus according to claim 9, wherein said sixth means further includes means for preventing the value of said respective engine timing code from being modified in response to said fourth means producing said output signal associated with said respective engine timing code.

11. A control apparatus according to claim 9, wherein said second plurality of registers includes a first register for storing a first engine control code representative of the angular rotation of the crankshaft from its position at which an immediately precedent ignition occurs to its position at which conduction of primary current in an ignition coil is to be initiated, and wherein said engine timing codes include a first engine timing code that is compared by said fourth means with said first engine control code.

12. A control apparatus according to claim 11, wherein said sixth means includes means for causing said fourth means to compare said first engine timing code with said preselected engine control code in response to said fourth means producing an output signal associated with said first engine timing code.

13. A control apparatus according to claim 11, wherein said second plurality of registers includes a register for storing an engine control code representative of the angular rotation of the crankshaft from its position at top dead center to its position at which conduction of primary current in the ignition coil is to be terminated, and wherein said engine timing codes includes an engine timing code that is compared by said fourth means with said stored engine control code.

14. A control apparatus according to claim 13, wherein said sixth means includes means for causing said fourth means to compare said stored first engine timing code with said preselected engine control code in response to said fourth means producing an output signal associated with said stored first engine timing code.

15. A control apparatus according to claim 14, wherein said sixth means further includes means for preventing the value of said stored first engine timing code from being modified in response to said fourth means producing an output signal associated with said stored first engine timing code.

16. A control apparatus according to claim 11, wherein said sixth means further includes means for preventing the value of said engine timing code from being modified in response to said fourth means producing an output signal associated with said first engine timing code.

17. A control apparatus according to claim 11, wherein said second plurality of registers includes a second register for storing a second engine control code representative of the angular rotation of the crankshaft from its position at top dead center to its position at which conduction of primary current in the ignition coil is to be terminated, and wherein said engine timing codes include a second engine timing code that is compared by said fourth means with said second engine control code.

18. A control apparatus according to claim 17, wherein said second plurality of registers includes a third register for storing a third engine control code representative of a prescribed angular rotation of the crankshaft relative to top dead center, and wherein said engine timing codes include a third timing engine code that is compared by said fourth means with said third engine control code.

19. A control apparatus according to claim 18, wherein said first plurality of registers includes a first register containing said first engine timing code, a second register containing said second engine timing code and a third register containing said third engine timing code.

20. A control apparatus according to claim 19, wherein said sixth means includes means for resetting the value of said second engine timing code contained in said second register to a prescribed base value in response to said fourth means detecting that the value of said third engine timing code is at least equal to the value of said third engine control code.

21. A control apparatus according to claim 20, wherein said sixth means includes means for resetting the value of said first engine timing code contained in said first register to a prescribed base value in response to said fourth means detecting that the value of said second engine timing code is at least equal to the value of said second engine control code.

22. A control apparatus according to claim 19, wherein said sixth means includes means for causing the values of said first, second and third engine timing codes to be retained in said first, second and third registers respectively until said registers are reset by said fourth means.

23. A control apparatus according to claim 17, wherein said sixth means includes means for causing said fourth means to compare said second engine timing code with said preselected engine control code in response to said fourth means producing an output signal associated with said second engine timing code.

24. A control apparatus according to claim 23, wherein said sixth means further includes means for preventing the value of said second engine timing code from being modified in response to said fourth means producing an output signal associated with said second engine timing code.

25. A control apparatus according to claim 18, wherein said sixth means includes means for causing said fourth means to compare said third engine timing code with said preselected engine control code in response to said fourth means producing an output signal associated with said second engine timing code.

26. A control apparatus according to claim 25, wherein said sixth means further includes means for preventing the value of said third engine timing code from being modified in response to said fourth means producing an output signal associated with said second engine timing code.

27. A control apparatus according to claim 8, wherein said second plurality of registers includes a register for storing a first engine control code representative of a prescribed angular rotation of the crankshaft relative to top dead center, and wherein said engine timing codes include a first engine timing code that is compared by said fourth means with said stored first engine control code.

28. A control apparatus according to claim 27, wherein said sixth means includes means for causing fourth means to compare said stored engine timing code with said preselected engine control code in response to said fourth means producing an output signal associated with said stored engine timing code.

29. A control apparatus according to claim 28, wherein said sixth means further includes means for preventing the value of said stored engine timing code from being modified in response to said fourth means producing an output signal associated with said stored engine timing code.

30. A control apparatus according to claim 27, wherein said second plurality of registers includes a register for storing a second engine control code defined in accordance with the number of cylinders of said engine, and wherein said engine timing codes includes an engine timing code that is compared by said fourth means with said second engine control code.

31. A control apparatus according to claim 30, wherein
said energy conversion functions include the supply of fuel to the engine,
one of said actuator means comprises means for supplying fuel to the engine,
said second plurality of registers includes a register for storing a third engine control code representative of the duration of the supply of fuel to the engine by said fuel supply means, and
wherein said third means includes means for modifying the value of the engine timing code stored in that one of said first plurality of registers associated with said third engine control code in accordance with the output of said fourth means produced in response to said first engine control code.

32. A control apparatus according to claim 31, wherein said third means includes means for modifying the value of the engine timing code stored in that one of said first plurality of registers until the value of the engine timing code compared by said fourth means with said second engine control code reaches a value causing said fourth means to produce an output.

33. A control apparatus according to claim 32, wherein said second plurality of registers includes a register for storing a fourth engine control code representative of the angular rotation of the crankshaft from its position at top dead center to its position at which conduction of primary current in the ignition coil is to be terminated, and wherein said engine timing codes include a second engine timing code that is compared by said fourth means with said fourth engine control code.

34. A control apparatus according to claim 33, wherein said sixth means further includes means for preventing the value of said fourth engine timing code from being modified in response to said fourth means producing an output signal associated with said fourth engine timing code.

35. A control apparatus according to claim 34, wherein said second plurality of registers includes a register for storing a fifth engine control code representative of the angular rotation of the crankshaft from its position at which an immediately precedent ignition occurs to its position at which conduction of primary current in an ignition coil is to be initiated, and wherein said engine timing codes include a fifth engine timing code that is compared by said fourth means with said fifth engine control code.

36. A control apparatus according to claim 35, wherein said sixth means further includes means for preventing the value of said fifth engine timing code from being modified in response to said fourth means producing an output signal associated with said fifth engine timing code.

37. A control apparatus according to claim 7, wherein said controllably modifying means comprises
means for selectively incrementing the data value of a respective engine timing code by a prescribed value in response to receipt of a respective portion of said engine control timing signal pattern that is associated with that engine timing code.

38. A control apparatus according to claim 37, wherein said incrementing means comprises
   means for temporarily storing the engine timing code stored by said respective one of said first plurality of storage devices, and
   means for receiving the engine timing code from said temporarily storing means and selectively incrementing the data value of said code and causing the engine timing code stored in said respective one of said first plurality of storage devices to be replaced by said code the data value of which has been selectively incremented.

39. A control apparatus according to claim 37, wherein said incrementing means comprises
   means for reading out the engine timing code stored by each respective one of said first plurality of storage devices and temporarily storing said readout engine timing code during a first interval of time, and
   means for receiving the engine timing code from said temporarily storing means and selectively incrementing the data value of said code and causing the engine timing code stored in said respective one of said first plurality of storage devices to be replaced by said code the data value of which has been selectively incremented during a second interval of time subsequent to said first interval of time.

40. A control apparatus according to claim 7, wherein said fifth means includes
   a first plurality of storage means for selectively storing the respective output signals produced by said fourth means; and
   a second plurality of storage means, coupled to the respective ones of said first plurality of storage means, for receiving and storing the output signals stored by said first plurality of storage means.

41. A control apparatus according to claim 40, wherein said controllably modifying means includes means, coupled to said fifth means, for controllably modifying the engine timing codes stored in said first plurality of storage devices in dependence upon the output signals stored said second plurality of storage means.

42. A control apparatus according to claim 41, wherein said fifth means further includes means for causing a respective storage means of said first plurality of storage means to store a respective output signal produced by said fourth means during a first interval of time and thereafter causing a corresponding respective storage means of said second plurality of storage means to receive and store said respective output signal stored in said respective storage means of said first plurality of storage means during a second interval of time subsequent to said first interval of time.

43. A control apparatus according to claim 42, wherein said controllably modifying means comprises
   means for selectively incrementing the data value of a respective engine timing code by a prescribed value in response to receipt of a respective portion of said engine control timing signal pattern that is associated with that engine timing code.

44. A control apparatus according to claim 43, wherein said incrementing means comprises
   means for reading out the engine timing code stored by each respective one of said first plurality of storage devices and temporarily storing said readout engine timing code during a first interval of time, and
   means for receiving the engine timing code from said temporarily storing means and selectively incrementing the data value of said code and causing the engine timing code stored in said respective one of said first plurality of storage devices to be replaced by said code the data value of which has been selectively incremented during a second interval of time subsequent to said first interval of time.

45. A control apparatus according to claim 7, wherein
   said plurality of sensors include rotation timing signal generating means for generating rotation timing signals in synchronization with rotation of the engine shaft,
   said third means further includes synchronization circuit means, coupled to said rotation timing signal generating means, for synchronizing the engine control timing signals of said engine control timing signal pattern with said rotation timing signals, and
   said controllably modifying means is coupled to controllably modify said engine timing codes in response to the output of said synchronization circuit means.

46. A control apparatus according to claim 1, wherein said energy conversion functions include at least one of fuel supply, ignition, exhaust gas return and idle condition of the engine.

47. A control apparatus according to claim 46, wherein engine control timing signals of said pattern include engine control timing signals of relatively different frequencies.

48. A control apparatus according to claim 47, wherein engine control timing signals of said pattern which relate to fuel supply and ignition of the engine have a frequency relatively high compared to the frequency of engine control timing signals of said pattern which relate to exhaust gas return and idle condition of the engine.

49. A control apparatus according to claim 46, wherein the engine control timing signals of said pattern include signals representative of a prescribed angle of rotation of the engine crankshaft INTL, the number of cycles of the engine CYL, advance ADV, dwell DWL, vehicle speed VSP, engine speed RPM, time of fuel injection INJ, exhaust gas return EGR, and idle condition NIDL.

50. A control apparatus according to claim 49, wherein the generation of said engine control timing signals follows the order INTL, CYL, INJ, ADV, DWL, EGR, NIDL.

51. A control apparatus according to claim 1, wherein said sixth means includes means for halting the incrementing of a respective engine timing code upon said prescribed relationship between said respective engine timing code and its corresponding engine control code being satisfied.

52. A control apparatus according to claim 51, wherein
   said energy conversion functions include the supply of fuel to the engine,
   one of said actuator means comprises a fuel supply means,
   one of the engine control codes stored by said second means represents the valve opening period of the fuel supply means, and said sixth means includes means for halting the incrementing of the value of that engine timing code corresponding to the engine control code that is associated with the valve opening period of the fuel supply means upon said prescribed relationship between the engine timing code and its corresponding engine control code associated with said valve opening period being satisfied.

53. In a processor-controlled apparatus for controlling the operation of an internal combustion engine for which sensor means produce signals representative of operating conditions of the engine, and being coupled to at least one actuator for controlling a respective energy conversion function of said engine in response to control signals applied thereto, a control apparatus comprising, in combination:
- a stage pulse generator for producing a plurality of stage pulses, each stage pulse being repeatedly generated at predetermined intervals;
- a plurality of register means for storing prescribed data, said register means being connected to said stage pulse generator to received a stage pulse which selects one of register means to deliver it stored contents;
- a plurality of counter means for counting up signals produced at predetermined time intervals and pulses generated in synchronism with the rotation of the engine, said counter means being connected to said stage pulse generator to received a stage pulse which selects one of said counter means to deliver its count value;
- a comparator means connected to said register means and counter means to receive the content of the selected one of said register means and the count value of the selected one of said counter means, and producing an output signal when received one of inputs is equal to or greater than the other;
- circuit means, connected to said comparator, for fixing at a respective predetermined value at least one of the contents of a register means and count value of a counter means when the comparator has once delivered an output signal; and
- an output circuit means connected to said comparator to receive the comparison result, for producing a control signal applied to an actuator.

54. A control apparatus for an internal combustion engine as defined in claim 53, wherein some of the stage pulses are shorter in time interval than the others so that particular register means and counter means corresponding to said some stage pulses are selected more frequently than the others.

55. A control apparatus for an internal combustion engine as defined in claim 53, wherein said counter means comprises holding means for a storing count value, a first latch circuit means connected to said holding means to receive the count value, an incrementor means connected to receive an output of said first latch circuit means and producing a count value to be applied to the holding means, said count value being produced by incrementing said received value in response to a control signal.

56. A control apparatus as defined in claim 55, which further comprises a clock pulse generator for producing a first clock pulse and a second clock pulse which do not overlap in time, the setting of data into said register means being conducted in synchronism with the first clock pulse while the setting of the count value into the first latch circuit means is conducted in synchronism with the second clock pulse.

57. A control apparatus as defined in claim 56, wherein the output circuit means comprises first holding means for setting the output signal of the comparator in synchronism with the first clock pulse and second holding means for setting the contents of the first holding means in synchronism with the second clock pulse.

58. A control apparatus as defined in claim 57, wherein the stage pulse generator comprises a stage counter for counting the first clock pulse, and a read only memory for delivering a predetermined stage pulse in response to the count value of the stage counter and a stage latch means for setting the stage pulse in synchronism with the second clock pulse.

59. A control apparatus as defined in claim 58, wherein some of the stage pulses are shorter than the others so that particular register means and counter means corresponding to said some of the stage pulses are selected more frequently than the others.

60. In a processor-controlled apparatus for controlling the operation of an internal combustion engine for which sensor means produce signals representative of operating conditions of the engine, and being coupled to at least one actuator for controlling a respective energy conversion function of said engine in response to control signals applied thereto, a control apparatus comprising, in combination:
- first register means for storing data representative of the magnitude of the crank angle from the angle at which an immediately preceding ignition is performed to the angle at which the conduction of primary current of an ignition coil is to be initiated;
- first counter means for counting up pulses generated in predetermined relationship with rotations of the engine;
- a comparator connected to said first register means and said first counter means to receive the set data of the first register means and the count value of the first counter means and producing an output signal when the count value becomes equal to or greater than the set data;
- first circuit means, connected to said comparator, for terminating a count operation of the first counter means so that the count value can be fixed when the comparator has once delivered the output signal; and
- an output circuit means connected to said comparator to receive the comparison result, for producing a control signal applied to said actuator for the control of an ignition timing.

61. A control apparatus for an internal combustion engine as defined in claim 60, which further comprises
- second register means for storing data representative of the magnitude of the crank angle from the angle at which a reference signal is generated to the angle at which the conduction of the primary current of the ignition coil is to be terminated, said reference signal being produced in a predetermined relationship with respect to the rotation of the engine crankshaft; and
- second counter means for counting up pulses which are generated each time the engine rotates a fixed crank angle, the data of the second register means and the count value of the second counter means being applied to the comparator whose output is connected to said first counter means to reset the count value thereof, and said reference signal being used to reset the count value of the second counter means.

62. A control apparatus for an internal combustion engine as defined in claim 61, which further comprises second circuit means, connected to said comparator, for terminating the count operation of the second counter means when the count value of the second counter means has become equal to or greater than the set value of the second register means.

63. In a processor-controlled apparatus for controlling the operation of an internal combustion engine for which sensor means produce signals representative of operating conditions of the engine, and being coupled to at least one actuator for controlling a respective energy conversion function of said engine in response to control signals applied thereto, a control apparatus comprising, in combination:
   first register means for storing data indicative of the valve opening time of a fuel injection value;
   first counter means for counting pulses which are produced periodically, said counter means being reset by signals which are produced in synchronism with the rotation of the engine cranshaft;
   a comparator connected to said first register means and to said first counter means to receive the set data of the first register means and the count value of the first counter means and producing an output signal when the count value becomes equal to or greater than the set data;
   first circuit means, connected to said comparator, for fixing a value to be compared with the count value at the comparator when the comparator has once delivered the output signal; and
   output circuit means, connected to said comparator to receive the comparison result, for producing a control signal applied to said actuator for the control of the supply fuel to said engine.

64. A control apparatus for an internal combustion engine as defined in claim 63, in which said first circuit means comprises a second register into which a predetermined value is preliminarily set and circuit means, connected to said comparator, for producing a signal which selects said second register to deliver its set value to said comparator when the count value of the first counter means reaches the data set in the first register.

65. A control apparatus for an internal combustion engine as defined in claim 64, which further comprises third register for storing data representative of the number of cylinders of the internal combustion engine; second counter means for counting a reference signal produced in a predetermined relationship with the rotation of the engine crankshaft, the set data of the third register and the count value of the second counter means being applied to the comparator to produce an output signal when the count value has reached the set data.

66. A control apparatus for an internal combustion engine as defined in claim 65, which further comprises additional register means for storing data representative of the magnitude of the crank angle from the position at which a sensor is provided for detecting the rotation of the engine crankshaft to the position at which the reference signal is to be generated; and additional counter means for counting pulses produced each time the engine crankshaft rotates a fixed crank angle, the set data of the additional register means and the count value of the additional counter means being applied to said comparator to produce said reference signal when the count value has reached the set data.

67. For use in a processor-controlled apparatus for controlling the operation of an internal combustion engine for which sensor means produce signals representative of operating conditions of the engine, and being coupled to actuator means for controlling respective energy conversion functions of said engine in response to control signals applied thereto, a control apparatus comprising, in combination:
   first means for generating an engine control timing signal pattern through which operational events of said engine are controlled;
   second means for storing predetermined engine control codes;
   third means, coupled to said first means, for generating respective engine timing codes the values of which are selectively modified by said engine control timing pattern;
   fourth means, coupled to said second and third means, for comparing respective ones of said engine control codes with respective ones of said engine timing codes and, in response to said respective engine control codes defining a prescribed relationship with respect to said engine timing codes, causing control signals to be coupled to said actuator means; and
   fifth means, coupled to said fourth means, for preventing the effect of a prescribed control signal upon a prescribed actuator means from being changed for a controllable interval of time subsequent to the time that a corresponding prescribed one of said engine control codes defines said prescribed relationship with respect to a prescribed engine timing code.

68. For use in a processor-controlled apparatus for controlling the operation of an internal combustion engine for which sensor means produce signals representative of operating conditions of the engine, and being coupled to actuator means for controlling respective energy conversion functions of said engine in response to control signals applied thereto, a control apparatus comprising, in combination:
   first means for generating an engine control timing signal pattern through which operational events of said engine are controlled;
   second means for storing predetermined engine control codes;
   third means, coupled to said first means, for generating respective engine timing codes the values of which are selectively modified by said engine control timing pattern;
   fourth means, coupled to said second and third means, for comparing respective ones of said engine control codes with respective ones of said engine timing codes and, in response to said respective engine control codes defining a prescribed relationship with respect to said engine timing codes, causing control signals to be coupled to said actuator means; and
   fifth means, coupled to said fourth means and responsive to a selected engine control code defining said prescribed relationship with respect to an associated selected engine timing code, for maintaining the control signal, generated in response to said selected engine control code defining said prescribed relationship with respect to said associated engine timing code, for a controlled interval of time irrespective of the value of said engine control code during said controlled interval of time.

69. For use in a processor-controlled apparatus for controlling the operation of an internal combustion engine for which sensor means produce signals representative of operating conditions of the engine, and being coupled to actuator means for controlling respective energy conversion functions of said engine in response to control signals applied thereto, a control apparatus comprising, in combination:

first means for generating an engine control timing signal pattern through which operational events of said engine are controlled;

second means for storing predetermined engine control codes;

third means, coupled to said first means, for generating respective engine timing codes the values of which are selectively modified by said engine control timing pattern;

fourth means, coupled to said second and third means, for comparing respective ones of said engine control codes with respective ones of said engine timing codes and producing respective output signals when said respective engine control codes define a prescribed relationship with respect to said engine timing codes;

fifth means, coupled to said fourth means, for producing control signals to be coupled to said actuator means in response to the output signals produced by said fourth means, and sixth means, coupled to said third and fourth means, for causing said fourth means to compare one of a preselected engine timing code and a preselected engine control code with a prescribed reference code in response to said fourth means producing an output signal associated with said respective engine timing code.

70. For use in a processor-controlled apparatus for controlling the operation of an internal combustion engine for which sensor means produce signals representative of operating conditions of the engine, and being coupled to actuator means for controlling respective energy conversion functions of said engine in response to control signals applied thereto, a control apparatus comprising, in combination:

first means for storing predetermined engine control codes;

second means for generating respective engine timing codes the values of which are selectively modified;

third means, coupled to said first and second means, for comparing respective ones of said engine control codes with respective ones of said engine timing codes and, in response to said respective engine control codes defining a prescribed relationship with respect to said engine timing codes, causing control signals to be coupled to said actuator means; and fourth means, coupled to said third means, for preventing the effect of a prescribed control signal upon a prescribed actuator means from being changed for a controllable interval of time subsequent to the time that a corresponding prescribed one of said engine control codes defines said prescribed relationship with respect to a prescribed engine timing code.

71. For use in a processor-controlled apparatus for controlling the operation of an internal combustion engine for which sensor means produce signals representative of operating conditions of the engine, and being applied to actuator means for controlling respective energy conversion functions of said engine in response to control signals applied thereto, a control apparatus comprising, in combination:

first means for storing predetermined engine control codes;

second means for generating respective engine timing codes the values of which are selectively modified;

third means, coupled to said first and second means, for comparing respective ones of said engine control codes with respective ones of said engine timing codes and, in response to said respective engine control codes defining a prescribed relationship with respect to said engine timing codes, causing control signals to be coupled to said actuator means; and fourth means, coupled to said third means and responsive to a selected engine control code defining said prescribed relationship with respect to an associated selected engine timing code, for maintaining the control signal, generated in response to said selected engine control code defining said prescribed relationship with respect to said associated engine timing code, for a controlled interval of time irrespective of the value of said engine control code during said controlled interval of time.

72. For use in a processor-controlled apparatus for controlling the operation of an internal combustion engine for which sensor means produce signals representative of operating conditions of the engine, and being coupled to actuator means for controlling respective energy conversion functions of said engine in response to control signals applied thereto, a control apparatus comprising, in combination:

first means for storing predetermined engine control codes;

second means for generating respective engine timing codes the values of which are selectively modified;

third means, coupled to said first and second means, for comparing respective ones of said engine control codes with respect ones of said engine timing codes and producing respective output signals when said respective engine control codes define a prescribed relationship with respect to said engine timing codes;

fourth means, coupled to said third means, for producing control signals to be coupled to said actuator means in response to the output signals produced by said fourth means, and fifth means, coupled to said second and third means, for causing said fourth means to compare one of a preselected engine timing code and a preselected engine control code with a prescribed reference code in response to said third means producing an output signal associated with said respective engine timing code.

\* \* \* \* \*